United States Patent
Shechtman et al.

(10) Patent No.: US 10,791,318 B2
(45) Date of Patent: Sep. 29, 2020

(54) MULTI-WAVELENGTH PHASE MASK

(71) Applicant: The Board of Trustees of the Leland Stanford Junior University, Stanford, CA (US)

(72) Inventors: Yoav Shechtman, Santa Clara, CA (US); William E. Moerner, Stanford, CA (US); Lucien Weiss, Los Angeles, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/439,491

(22) Filed: Jun. 12, 2019

(65) Prior Publication Data

US 2019/0356902 A1 Nov. 21, 2019

Related U.S. Application Data

(62) Division of application No. 15/096,127, filed on Apr. 11, 2016, now Pat. No. 10,341,640.

(60) Provisional application No. 62/146,024, filed on Apr. 10, 2015.

(51) Int. Cl.
| | |
|---|---|
| H04N 13/218 | (2018.01) |
| G02B 21/00 | (2006.01) |
| G02B 26/06 | (2006.01) |
| H04N 13/161 | (2018.01) |
| H04N 13/214 | (2018.01) |
| H04N 13/271 | (2018.01) |

(52) U.S. Cl.
CPC ......... *H04N 13/218* (2018.05); *G02B 21/008* (2013.01); *G02B 21/0028* (2013.01); *G02B 21/0032* (2013.01); *G02B 21/0056* (2013.01); *G02B 21/0064* (2013.01); *G02B 26/06* (2013.01); *H04N 13/161* (2018.05); *H04N 13/214* (2018.05); *H04N 13/271* (2018.05)

(58) Field of Classification Search
CPC combination set(s) only.
See application file for complete search history.

(56) References Cited

U.S. PATENT DOCUMENTS

| | | | |
|---|---|---|---|
| 6,330,388 B1 * | 12/2001 | Bendett | C03C 4/00 385/132 |
| 7,342,717 B1 | 3/2008 | Hausmann et al. | |
| 7,538,764 B2 * | 5/2009 | Salomie | G06T 17/20 345/418 |
| 7,705,970 B2 * | 4/2010 | Piestun | G01C 3/08 356/4.01 |
| 8,558,873 B2 | 10/2013 | McEldowney | |
| 8,586,945 B2 | 11/2013 | Reuss et al. | |
| 8,608,314 B2 | 12/2013 | Yoon et al. | |

(Continued)

OTHER PUBLICATIONS

Shechtman, Yoav, et al. "Optimal point spread function design for 3D imaging." Physical review letters 113.13 (2014): 133902. Abstract only.

(Continued)

*Primary Examiner* — Tsung Yin Tsai
(74) *Attorney, Agent, or Firm* — Crawford Maunu PLLC

(57) ABSTRACT

Among other aspects, various embodiments include encoding wavelength-based characteristics, in addition to three-dimensional positions, of a plurality of objects of a plurality of different wavelengths directly in an image of the objects.

20 Claims, 14 Drawing Sheets

(56) References Cited

U.S. PATENT DOCUMENTS

| | | | |
|---|---|---|---|
| 9,075,010 B2 | 7/2015 | Moerner et al. | |
| 9,881,355 B2 | 1/2018 | Piestun et al. | |
| 2003/0047688 A1 | 3/2003 | Faris et al. | |
| 2003/0072528 A1* | 4/2003 | Jacobowitz | G02B 6/29322 385/37 |
| 2005/0046865 A1* | 3/2005 | Brock | G01B 9/02057 356/495 |
| 2006/0078113 A1* | 4/2006 | Javidi | G03H 1/12 380/210 |
| 2006/0126921 A1 | 6/2006 | Shorte et al. | |
| 2006/0274394 A1 | 12/2006 | Riley et al. | |
| 2007/0146873 A1 | 6/2007 | Ortyn et al. | |
| 2009/0161519 A1* | 6/2009 | Yamamoto | G11B 7/0065 369/103 |
| 2010/0278400 A1* | 11/2010 | Piestun | G02B 21/0076 382/128 |
| 2011/0002530 A1 | 1/2011 | Zhuang et al. | |
| 2011/0025831 A1 | 2/2011 | Bewersdorf et al. | |
| 2011/0174986 A1 | 7/2011 | Kempe et al. | |
| 2011/0249866 A1* | 10/2011 | Piestun | H04N 13/204 382/103 |
| 2013/0147925 A1 | 6/2013 | Lew et al. | |
| 2015/0077842 A1* | 3/2015 | Kleppe | G02B 21/0032 359/370 |
| 2015/0192510 A1 | 7/2015 | Piestun et al. | |
| 2015/0323787 A1* | 11/2015 | Yuste | G06K 9/00134 348/79 |
| 2016/0125610 A1 | 5/2016 | Piestun et al. | |
| 2016/0231553 A1* | 8/2016 | Piestun | G02B 21/367 |
| 2016/0301914 A1* | 10/2016 | Shechtman | H04N 13/161 |

OTHER PUBLICATIONS

Shechtman, Yoav, et al. "Precise Three-Dimensional Scan-Free Multiple-Particle Tracking over Large Axial Ranges with Tetrapod Point Spread Functions." Nano letters 15.6 (2015): 4194-4199.

Broeken, Jordi, Bernd Rieger, and Sjoerd Stallinga. "Simultaneous measurement of position and color of single fluorescent emitters using diffractive optics." Optics letters 39.11 (2014): 3352-3355.

Shechtman, Y., et al. "Optimal point spread function design for 3D imaging." Physical review letters 113.13 (2014): 133902-133902.

Jia, S., J. C. Vaughan, and X. Zhuang. "Isotropic 3D Super-resolution Imaging with a Self-bending Point Spread Function." Nature photonics 8 (2013): 302-306.

Backlund, M. P., et al. "Correlations of three-dimensional motion of chromosomal loci in yeast revealed by the double-helix point spread function microscope." Molecular biology of the cell 25.22 (2014): 3619-3629.

Halpern, A. R., Howard, M. D. & Vaughan, J. C. Point by Point: An Introductory Guide to Sample Preparation for Single-Molecule, Super-Resolution Fluorescence Microscopy. Curr Protoc Chem Biol, 103-120 (2015).

Zhang, Z., Kenny, S. J., Hauser, M., Li, W. & Xu, K. Ultrahigh-throughput single-molecule spectroscopy and spectrally resolved super-resolution microscopy. Nature methods 12, 902 (2015).

Pavani, Sri Rama Prasanna, et al. "Three-dimensional, single-molecule fluorescence imaging beyond the diffraction limit by using a double-helix point spread function." PNAS 106.9 (2009): 2995-2999.

Thomann, D., et al. "Automatic fluorescent tag detection in 3D with super-resolution: application to the analysis of chromosome movement." Journal of Microscopy 208.Pt 1 (2002): 49-64.

Juette, Manuel F., et al. "Three-dimensional sub-100 nm resolution fluorescence microscopy of thick samples." Nature Methods 5.6 (2008): 527.

E. Toprak et al., "Defocused orientation and position imaging (DOPI) of myosin V," PNAS 103, 6495-6499 (2006).

T. Gould et al., "Nanoscale imaging of molecular positions and anisotropies," Nature Methods 5, 1027-1030 (2008).

M. Backlund et al., "Simultaneous, accurate measurement of the 3D position and orientation of single molecules," PNAS 109, 19087-19092, (2012).

Davis et al., "Interferometric Synthetic Aperture Microscopy: Computed Imaging for Scanned Coherent Microscopy", Sensors 2008, 8, pp. 3903-3931.

Backlund et al., "The Role of Molecular Dipole Orientation in Single-Molecule Fluorescence Microscopy and Implications for Super-Resolution Imaging" ChemPhysChem 2014, 15, 587-599.

Toprak et al., "New Fluorescent Tools for Watching Nanometer-Scale Conformational Changes of Single Molecules Annual Review of Biophysics and Biomolecular Structure," vol. 36: 349-369 (Volume publication date Jun. 2007).

Backlund et al., "The Double-helix point spread function enables precise and accurate measurement of 3D single-molecule localization and orientation", Proc Soc Photo Opt Instrum Eng. Feb. 22, 2013; 8590.

M. Thompson et al., "Three-dimensional tracking of single mRNA particles in *Saccharomyces cerevisiae* using a double helix point spread function", PNAS 107, 17864-17871 (2010).

A. Gahlmann et al., "Quantitative Multicolor Subdiffraction Imaging of Bacterial Protein Ultrastructures in Three Dimensions", Nano Lett. 13, 987-993 (2013) Abstract.

T. Ha et al.,"Hindered Rotational Diffusion and Rotational Jumps of Single Molecules" PRL 80, 2093-2096 (1998). Abstract Only.

H. Sosa & E. Peterman et al., "ADP-induced rocking of the kinesin motor domain revealed by single-molecule fluorescence polarization microscopy" Nature Struct. Bio. 8, 540-544 (2001).

A. Backer et al., "Single-molecule orientation measurements with a quadrated puupil", Optics Lett., 38, 1521-1523 (2013).

Tseng, "Ultrafast Coherent Control Spectroscopy" dissertation, Stony Brook University, 2012.

Engelhardt, Johann, et al. "Molecular orientation affects localization accuracy in superresolution far-field fluorescence microscopy." Nano letters 11.1 (2010): 209-213.

M. Lew & M. Backlund, "Rotational Mobility of Single Molecules Affects Localization Accuracy in Super-Resolution Fluorescence Microscopy" Nano Lett. 13, 3967-3972 (2013).

Böhmer, Martin, and Jörg Enderlein. "Orientation imaging of single molecules by wide-field epifluorescence microscopy." JOSA B 20.3 (2003): 554-559.

Axelrod, Daniel. "Fluorescence excitation and imaging of single molecules near dielectric-coated and bare surfaces: a theoretical study." Journal of microscopy 247.2 (2012): 147-160.

H. D. Lee, S. J. Sahl, M. D. Lew and W. E. Moerner, "The double-helix microscope super-resolves extended biological structures by localizing single blinking molecules in three dimensions with nanoscale precision" Appl. Phys. Lett. 100, 153701 (2012).

Lew, Matthew D., Alexander RS von Diezmann, and W. E. Moerner. "Easy-DHPSF open-source software for three-dimensional localization of single molecules with precision beyond the optical diffraction limit." Protocol exchange 2013 (2013).

Sahl, S. J., and W. E. Moerner. "Super-resolution fluorescence imaging with single molecules." Current opinion in structural biology 23.5 (2013): 778-787.

Rust, Michael J., Mark Bates, and Xiaowei Zhuang. "Sub-diffraction-limit imaging by stochastic optical reconstruction microscopy (STORM)." Nature Methods 3.10 (2006).

Stallinga, Sjoerd, and Bernd Rieger. "Accuracy of the Gaussian Point Spread Function model in 2D localization microscopy." (2010).

Enderlein, Jörg, Erdal Toprak, and Paul R. Selvin. "Polarization effect on position accuracy of fluorophore localization." (2006).

Mortensen, Kim I., et al. "optimized localization analysis for single-molecule tracking and super-resolution microscopy." nature methods 7.5 (2010): 377.

J. R. Lakowicz, Principles of Fluorescence Spectroscopy, 3rd edn. (Springer Science, New York, 2006).

Chao, Jerry, E. Sally Ward, and Raimund J. Ober. "Fisher information matrix for branching processes with application to electron-multiplying charge-coupled devices."

(56) References Cited

OTHER PUBLICATIONS

Lord, Samuel J., et al. "Photophysical Properties of Acene DCDHF Fluorophores: Long-Wavelength Single-Molecule Emitters Designed for Cellular Imaging." J. Phys. Chem. A 111 (2007): 8934-8941.
Bates, Mark, et al. "Multicolor Super-Resolution Fluorescence Imaging via Multi-Parameter Fluorophore Detection." ChemPhysChem 13, 99 (2012).
Testa, Ilaria, et al. "Nanoscale separation of molecular species based on their rotational mobility." Opt.Express 16, 21093 (2008).
Kao, H. P. and Verkman, A. S., "Tracking of Single Fluorescent Particles in Three Dimensions: Use of Cylindrical Optics to Encode Particle Position," Biophys. J. 67, pp. 1291-1300, (1994).
Piestun, R.; Schechner, Y. Y. and Shamir, J., "Propagation-Invariant Wave Fields with Finite Energy," J. Opt. Soc. Am. A, vol. 17, No. 2, (2000).
Thompson, R. E.; Larson, D. R. and Webb, W. W., "Precise Nanometer Localization Analysis for Individual Fluorescent Probes," Biophys J, vol. 82, pp. 2775-2783, (2002).
Ober, R. J.; Ram, S. and Ward, E. S., "Localization Accuracy in Single-Molecule Microscopy," Biophys J., vol. 86, pp. 1185-1200, (2004).
Prabhat, P.; Ram, S.; Ward, E. S. and Ober, R. J., "Simultaneous Imaging of Different Focal Planes in Fluourescence Microscopy for the Study of Cellular Dynamics in Three Dimensions," IEEE Transactions on Nanobioscience 3(4), pp. 237-242, (2004).
Betzig, E.; Patterson, G. H.; Sougrat, R.; Lindwasser, O. W.; Olenych, S.; Bonifacino, J. S.; Davidson, M. W.; Lippincott-Schwartz, J. and Hess, H. F., "Imaging Intracellular Fluorescent Proteins at Nanometer Resolution," Science, vol. 313, pp. 1642-1645, (2006).
Greengard, A.; Schechner, Y. Y. and Piestun, R., "Depth from Diffracted Rotation," Opt. Lett., vol. 31, No. 2, (2006).
Hess, S. T.; Girirajan, T. P. K. and Mason, M. D., "Ultra-high Resolution Imaging by Fluorescence Photoactivation Localization Microscopy," Biophys J., vol. 91, pp. 4258-4272, (2006).
Ram, S.; Prabhat, P.; Chao, J.; Ward, E. S. and Ober, R. J., "High Accuracy 3D Quantum Dot Tracking with Multifocal Plane Microscopy for the Study of Past Intracellular Dynamics in Live Cells," Biophys. J. vol. 95, pp. 6025-6043, (2008).
Huang, B.; Wang, W.; Bates, M. and Zhuang, X., "Three-Dimensional Super-Resolution Imaging by Stochastic Optical Resonstruction Microscopy," Science, vol. 319, p. 810, (2008).
Pavani, S. R. P. and Piestun, R., "Three Dimensional Tracking of Fluorescent Microparticles Using a Photon-Limited Double-Helix Response System," Opt. Express, vol. 16, No. 26, (2008).
Sun, Y.; McKenna, J. D.; Murray, J. M.; Ostap, E. M. and Goldman, Y. E., "Parallax: High Accuracy Three-Dimensional Single Molecule Tracking Using Split Images," Nano Lett. 9, pp. 2676-2682, (2009).
Shtengel, G.; Galbraith, J. A.; Galbraith, C. G.; Lippincott-Schwartz, J.; Gillette, J. M.; Manley, S.; Sougrat, R.; Waterman, C. M.; Kanchanawong, P.; Davidson, M. W.; Fetter, R. D. and Hess, H. F., "Interferometric Fluorescent Super-Resolution Microscopy Resolves 3D Cellular Ultrastructure," Proc. Natl. Acad. Sci. USA 106, 3125 (2009).
Piestun, Univ. of Colorado and published in S. R. P. Pavani, M. A. Thompson, J. S. Biteen, S. J. Lord, N. Liu, R. J. Twieg, R. Piestun, and W. E. Moerner, "Three-Dimensional Single-Molecule Fluorescence Imaging Beyond the Diffraction Limit Using a Double-Helix Point Spread Function," Proc. Nat. Acad. Sci. (USA) 106, 2995-2999 (published online, Feb. 11, 2009).
Tang, J.; Akerboom, J.; Vaziri, A.; Looger, L. L. and Shank, C. V., "Near-Isotropic 3D Optical Nanoscopy with Photon-Limited Chromophores," Proc. Natl. Acad. Sci. USA 107, pp. 10068-10073, (2010).
Badieirostami, M.; Lew, M. D.; Thompson, M. A. and Moerner, W. E., "Three-Dimensional Localization Precision of the Double-Helix Point Spread Function Versus Astigmatism and Biplane," Appl. Phys. Lett. 97, 161103, (2010).

Thompson, M. A.; Lew, M. D.; Badieirostami, M. and Moerner, W. E., "Localizing and Tracking Single Nanoscale Emitters in Three Dimensions with High Spatio-Temporal Resolution Using a Double-Helix Point Spread Function," Nano Lett. 10, pp. 211-218, (2010).
Einstein, Albert. "Über die von der molekularkinetischen Theorie der Wärme geforderte Bewegung von in ruhenden Flüssigkeiten suspendierten Teilchen." Annalen der physik 322.8 (1905): 549-560.
Von Smoluchowski, Marian. "Zur kinetischen theorie der brownschen molekularbewegung und der suspensionen." Annalen der physik 326.14 (1906): 756-780.
Richards, B., and E. Wolf. "Electromagnetic diffraction in optical systems. II. Structure of the image field in an aplanatic system." Proceedings of the Royal Society of London A: Mathematical, Physical and Engineering Sciences. vol. 253. No. 1274. The Royal Society, 1959.
Gelles, Jeff, Bruce J. Schnapp, and Michael P. Sheetz. "Tracking kinesin-driven movements with nanometre-scale precision." Nature 331.6155 (1988): 450-453.
Qian, Hong, Michael P. Sheetz, and Elliot L. Elson. "Single particle tracking. Analysis of diffusion and flow in two-dimensional systems." Biophysical journal 60.4 (1991): 910.
Kay, S. M. "Fundamentals of Statistical Signal Processing: Estimation Theory PTR Prentice Hall, Englewood Cliffs, NJ, 1993. 6 LL Scharf." Statistical Signal Process: Detection, Estimation, and Time Series Analysis.
Hell, S., et al. "Aberrations in confocal fluorescence microscopy induced by mismatches in refractive index." Journal of microscopy 169.3 (1993): 391-405. Abstract only.
Hell, Stefan W., and Jan Wichmann. "Breaking the diffraction resolution limit by stimulated emission: stimulated-emission-depletion fluorescence microscopy." Optics letters 19.11 (1994): 780-782.
Schmidt, Th, et al. "Imaging of single molecule diffusion." Proceedings of the National Academy of Sciences 93.7 (1996): 2926-2929.
Kino, Gordon S., and Timothy R. Corle. Confocal scanning optical microscopy and related imaging systems. Academic Press, 1996. Book description provided.
Weigl, BH, and P. Yager. "Silicon-microfabricated diffusion-based optical chemical sensor." Sensors and actuators. B, Chemical 39.1-3 (1997): 452-457. Abstract only.
Saxton, Michael J., and Ken Jacobson. "Single-Particle Tracking: Applications to Membrane Dynamics." Annu. Rev. Biophys. Biomol. Struct 26 (1997): 373-99.
Bettega P. Calzolari SM Doglia B. Dulio L. Tallone AM Villa, D. "Technical report: cell thickness measurements by confocal fluorescence microscopy on C3H10T1/2 and V79 cells." International journal of radiation biology 74.3 (1998): 397-403. Abstract only.
Peters, Inge M., et al. "Three dimensional single-particle tracking with nanometer resolution." Review of scientific instruments 69.7 (1998): 2762-2766. Abstract only.
Born, Max, Emil Wolf, and A. B. Bhatia. Principles of Optics: Electromagnetic Theory of Propagation, Interference and Diffraction of Light. Cambridge University Press, 1999. Book description provided.
Kamholz, Andrew Evan, et al. "Quantitative Analysis of Molecular Interaction in a Microfluidic Channel: The T-Sensor." Analytical Chemistry 71.23 (1999): 5340-5347.
Batchelor, George Keith. An introduction to fluid dynamics. Cambridge university press, 2000. Book description provided.
Ma, Yinfa, Michael R. Shortreed, and Edward S. Yeung. "High-throughput single-molecule spectroscopy in free solution." Analytical chemistry 72.19 (2000): 4640-4645. Abstract only.
Kamholz, Andrew Evan, Eric A. Schilling, and Paul Yager. "Optical Measurement of Transverse Molecular Diffusion in a Microchannel." Biophysical Journal 80 (2001): 1967-1972.
Fujiwara, Takahiro, et al. "Phospholipids undergo hop diffusion in compartmentalized cell membrane." The Journal of Cell Biology 157.6 (2002): 1071-1081.
Blab, Gerhard A., et al. "Simultaneous wide-field imaging and spectroscopy of localized fluorophores." Optics letters 29.7 (2004): 727-729. Abstract only.

(56) References Cited

OTHER PUBLICATIONS

Hanser, B. M., et al. "Phase-retrieved pupil functions in wide-field fluorescence microscopy." Journal of microscopy 216.1 (2004): 32-48.

Savin, Thierry, and Patrick S. Doyle. "Static and Dynamic Errors in Particle Tracking Microrheology." Biophysical Journal 88 (2005): 623-638.

Goodman, Joseph W. Introduction to Fourier optics. Roberts and Company Publishers, 2005. Book description provided.

Yager, Paul, et al. "Microfluidic diagnostic technologies for global public health." (2006).

Kim, S. Y.; Gitai, Z.; Kinkhabwala, A.; Shapiro, L.; Moerner, W. E. Proc. Natl. Acad. Sci. U. S. A. 2006, 29, 10929-10934.

Werley, Christopher A., and W. E. Moerner. "Single-molecule nanoprobes explore defects in spin-grown crystals." The Journal of Physical Chemistry B 110.38 (2006): 18939-18944 Abstract only.

Cohen, Adam E. Trapping and manipulating single molecules in solution. Diss. Stanford University, 2006.

Bock, H., et al. "Two-color far-field fluorescence nanoscopy based on photoswitchable emitters." Applied Physics B—Lasers and Optics 88.2 (2007): 161-165.

Holtzer, Laurent, Tobias Meckel, and Thomas Schmidt. "Nanometric three-dimensional tracking of individual quantum dots in cells." Applied Physics Letters 90.5 (2007): 053902.

Lee, Jungwoo, Meghan J. Cuddihy, and Nicholas A. Kotov. "Three-dimensional cell culture matrices: state of the art." Tissue Engineering Part B: Reviews 14.1 (2008): 61-86.

Abraham, A. V., Ram, S., Chao, J., Ward, E. S., & Ober, R. J. (2009). Quantitative study of single molecule location estimation techniques. Optics express, 17(26), 23352-23373.

Smith, C. S., Joseph, N., Rieger, B., & Lidke, K. A. (2010). Fast, single-molecule localization that achieves theoretically minimum uncertainty. Nature methods, 7(5), 373-375.

Adrian, Ronald J., and Jerry Westerweel. Particle image velocimetry. No. 30. Cambridge University Press, 2011. Book description provided.

Lew, Matthew D., et al. "Corkscrew point spread function for far-field three-dimensional nanoscale localization of pointlike objects." Optics letters 36.2 (2011): 202-204.

Baddeley, David, Mark B. Cannell, and Christian Soeller. "Three-dimensional sub-100 nm super-resolution imaging of biological samples using a phase ramp in the objective pupil." Nano Research 4.6 (2011): 589-598. Abstract only.

Lehmann, Martin, et al. "Quantitative multicolor super-resolution microscopy reveals tetherin HIV-1 interaction." PLoS Pathog 7.12 (2011): e1002456.

Dupont, Aurélie, and Don C. Lamb. "Nanoscale three-dimensional single particle tracking." Nanoscale 3.11 (2011): 4532-4541.

Cierpka, C., and C. J. Kähler. "Particle imaging techniques for volumetric three-component (3D3C) velocity measurements in microfluidics." Journal of visualization 15.1 (2012): 1-31.

Moerner, WE. "Microscopy beyond the diffraction limit using actively controlled single molecules." Journal of Microscopy 246.Pt 3 (2012): 213-220.

Michalet, Xavier, and Andrew J. Berglund. "Optimal diffusion coefficient estimation in single-particle tracking." Physical Review E 85.6 (2012): 061916.

Zervantonakisa, Ioannis K., et al. "Three-dimensional microfluidic model for tumor cell intravasation and endothelial barrier function." PNAS 109.34 (2012): 13515-13520.

Wu, Yicong, et al. "Spatially isotropic four-dimensional imaging with dual-view plane illumination microscopy." Nature biotechnology 31.11 (2013): 1032-1038.

Gahlmann, Andreas, et al. "Quantitative multicolor subdiffraction imaging of bacterial protein ultrastructures in 3D." Nano letters 13.3 (2013): 987.

Van den Dries, K., et al. "Dual-color superresolution microscopy reveals nanoscale organization of mechanosensory podosomes." Molecular biology of the cell 24.13 (2013): 2112-2123.

Cutler, Patrick J., et al. "Multi-color quantum dot tracking using a high-speed hyperspectral line-scanning microscope." PloS one 8.5 (2013): e64320.

Clausen, Mathias P., and B. Christoffer Lagerholm. "Visualization of plasma membrane compartmentalization by high-speed quantum dot tracking." Nano letters 13.6 (2013): 2332-2337.

Hu, Ying S., et al. "Single-Molecule Super-Resolution Light-Sheet Microscopy." Chemphyschem 15.4 (2014): 577-586.

Small, Alex, and Shane Stahlheber. "Fluorophore localization algorithms for super-resolution microscopy." Nature methods 11.3 (2014): 267-279.

Welsher, Kevin, and Haw Yang. "Multi-resolution 3D visualization of the early stages of cellular uptake of peptide-coated nanoparticles." Nature nanotechnology 9.3 (2014): 198-203. Abstract only.

Hajj, Bassam, et al. "Whole-cell, multicolor superresolution imaging using volumetric multifocus microscopy." Proceedings of the National Academy of Sciences 111.49 (2014): 17480-17485.

McGorty, Ryan, et al. "Correction of depth-dependent aberrations in 3D single-molecule localization and super-resolution microscopy." Optics Letters 39.2 (2014): 275-278. Abstract only.

Backer, Adam S., and W. E. Moerner. "Extending single-molecule microscopy using optical Fourier processing." The Journal of Physical Chemistry B 118.28 (2014): 8313-8329.

Backer, Adam S., et al. "A bisected pupil for studying single-molecule orientational dynamics and its application to three-dimensional super-resolution microscopy." Applied physics letters 104.19 (2014): 193701. Abstract only.

* cited by examiner

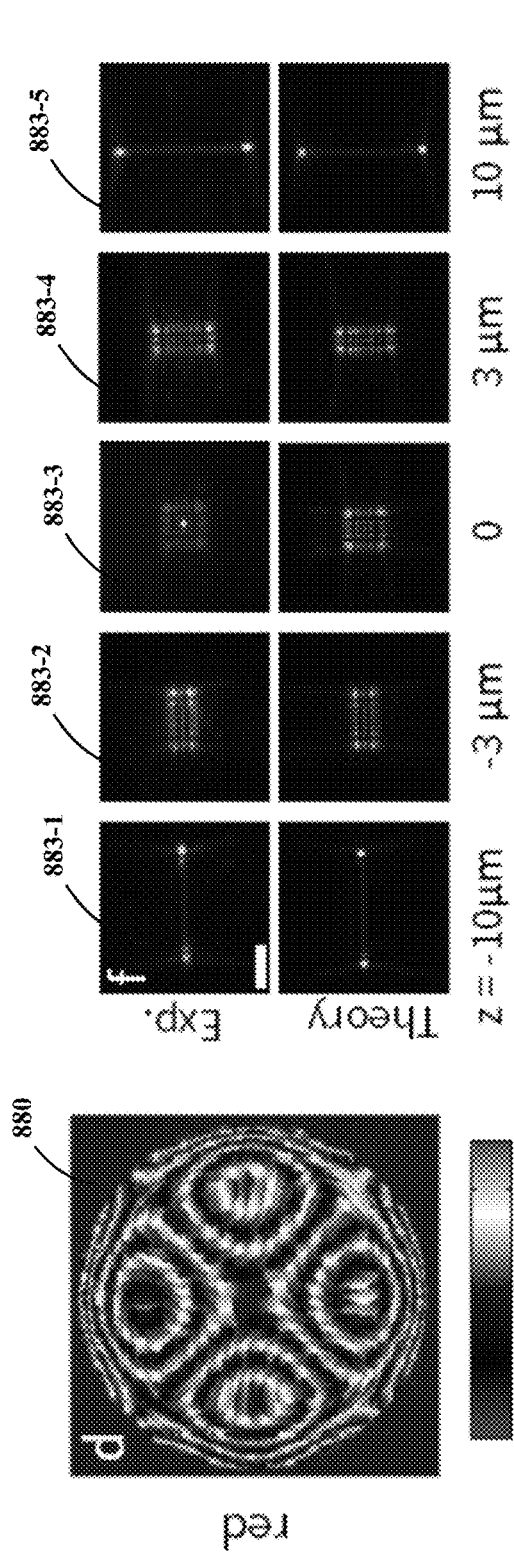
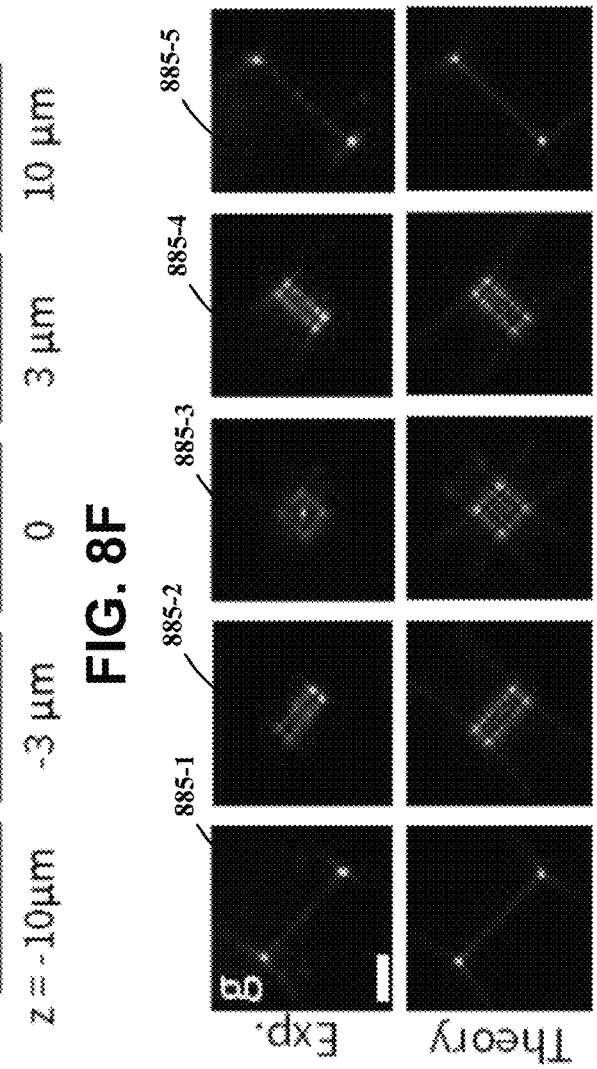
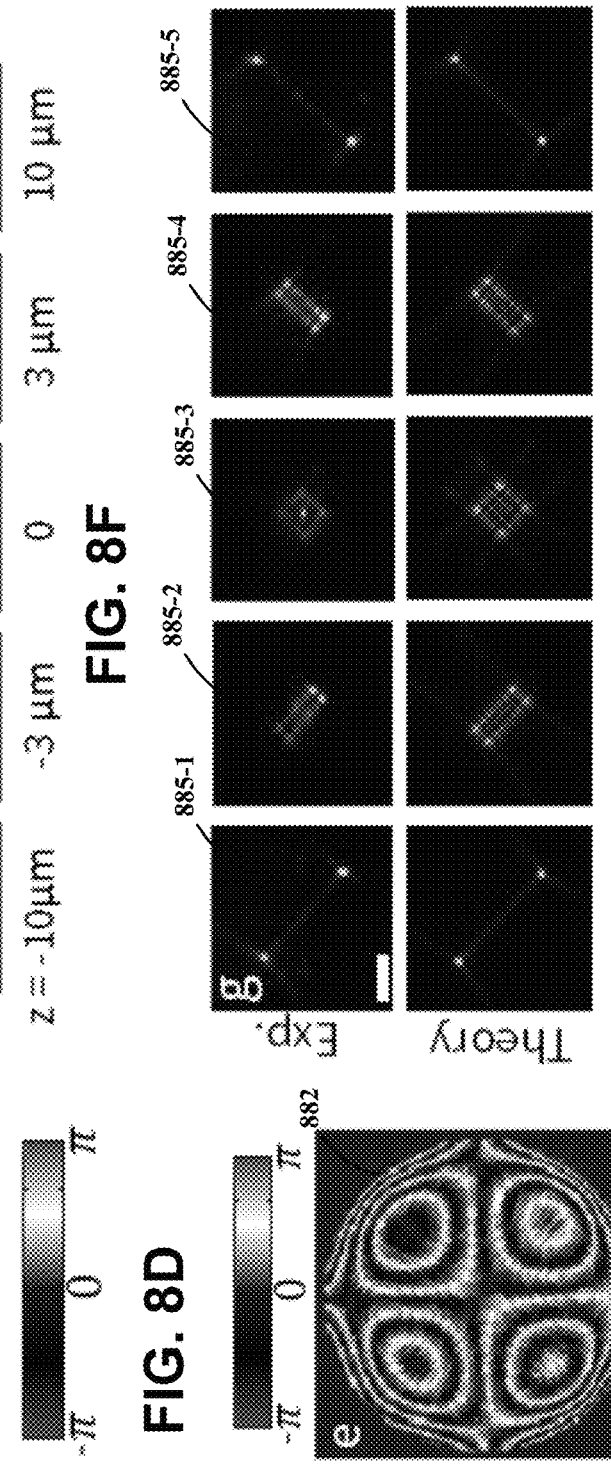
FIG. 8D  FIG. 8E  FIG. 8F  FIG. 8G

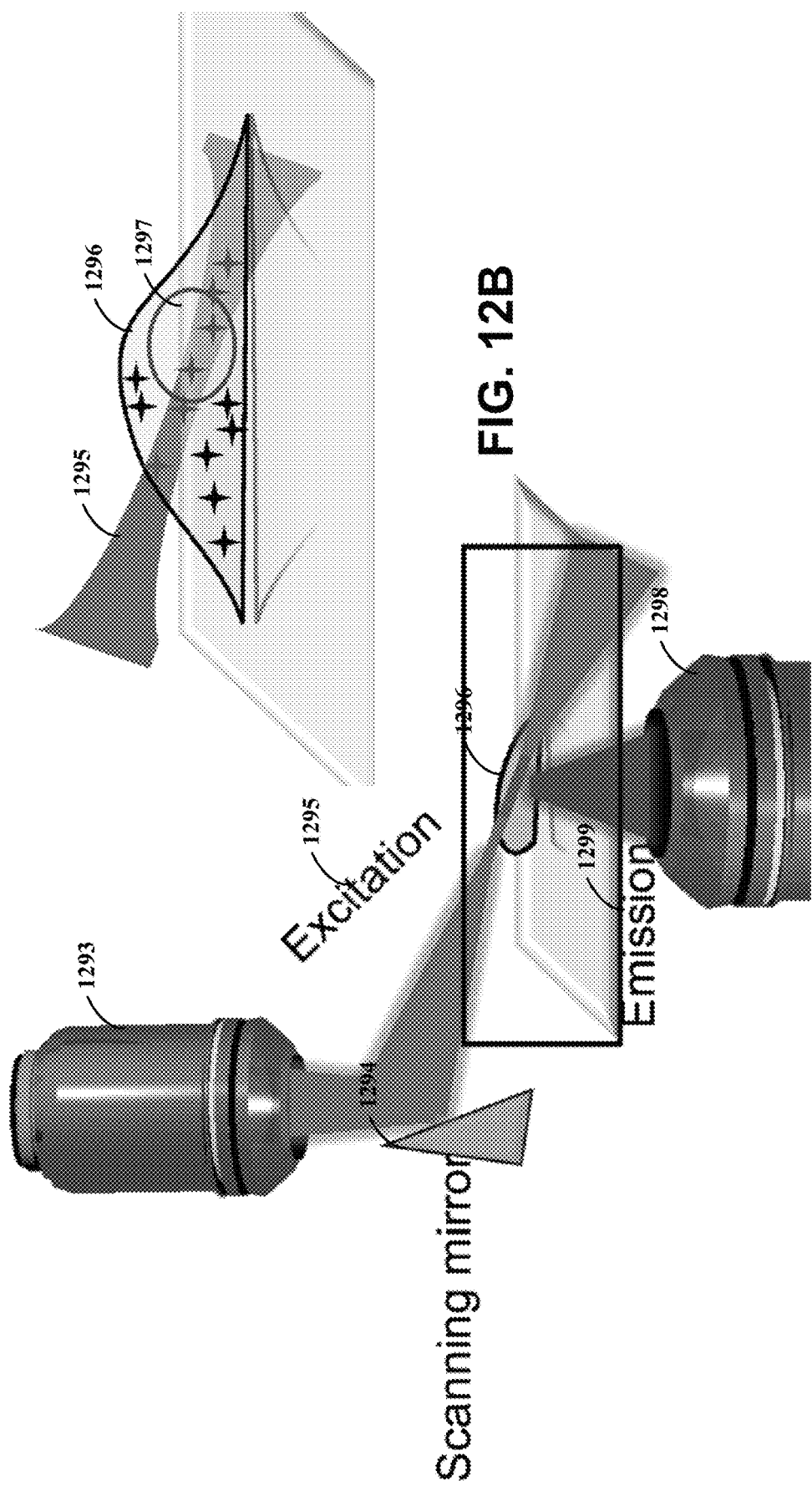

MULTI-WAVELENGTH PHASE MASK

FEDERALLY-SPONSORED RESEARCH AND DEVELOPMENT

This invention was made with Government support under contract GM085437 awarded by the National Institutes of Health. The Government has certain rights in the invention.

BACKGROUND

Understanding of living cells is beneficial for a variety of research and development. In order to understand the complex machinery at work within living cells, the position of individual biomolecules is measured. For example, single-particle tracking (SPT), in which the trajectory of a moving individual molecular label, quantum dot, or nanoparticle is determined, provides a valuable tool for a wide range of biological applications. Information inferred from the extracted particle trajectory sheds light on physical properties such as particle size, conformation, and the local environment, because observing the motion of single particles directly unmasks nanoscale behavior such as diffusion, directed motion, or anisotropy. A useful way to obtain information is to label different objects in different colors, increasing the optical complexity of the system.

These and other matters have presented challenges to three-dimensional imaging of multicolored particles, for a variety of applications.

SUMMARY

The present invention is directed to overcoming various challenges related to the types of devices and techniques discussed above and in other implementations. The present invention is exemplified in a number of implementations and applications, some of which are summarized below as examples.

Various embodiments in accordance with the present disclosure simultaneously measure all of these physical parameters, with minimal modification of a conventional microscope. For example, in some embodiments, a 4f optical processing circuitry is added to the camera of the conventional microscope. In other embodiments, prisms or gratings with wavelength-dependent characteristics are used to create a multiplicity of optical paths. In addition, such apparatus embodiments includes a relatively simple and cheap light-sheet microscope.

A number of aspects of the present disclosure include a method comprising encoding wavelength-based characteristics, in addition to data concerning or defining three-dimensional positions, of objects of a plurality of different wavelengths directly in an image of the objects. In various specific aspects, the wavelength-based characteristics are encoded (in addition to data concerning the three-dimensional positions), of the objects by simultaneously providing a different phase delay for (each of) the different wavelengths from light passing along an optical path using a phase mask. In specific aspects, wavelength-based characteristics and three-dimensional positions are encoded for at least two objects, using a single phase mask and within one field of view, that are labeled using different colors. Each of the different colors corresponds to one of the plurality of wavelengths. In related aspects, the image of the objects is generated by passing light along an optical path from the objects to a phase mask, and providing a different phase delay, using the phase mask, for each of the different wavelengths from the light passed along the optical path.

Various aspects of the present disclosure include an apparatus comprising a phase mask and circuitry. The phase mask is arranged with optics in an optical path to modify a shape of light for each of a plurality of wavelengths of light passed from a plurality of objects. For example, the shapes of light are modified for each respective wavelength independently of one another by the phase mask simultaneously providing different phase delays for each wavelength and using a single optical channel. The circuitry characterize a three-dimensional image of the objects based on each of the modified shapes of light and the respective wavelengths. In specific aspects, the circuitry detects relative movement of different ones of the objects based upon the modified shape of lights.

Other related aspects of the present disclosure include a method comprising providing optics and a phase mask in an optical path. Light is passed through the optical path to circuitry where the light is detectable. Further, circuitry encodes wavelength-based characteristics of a plurality of objects based on the detected light. For example, the wavelength-based characteristics of the objects are encoded by modifying a shape of light passing along the optical path for each of a plurality of wavelengths of light passed from the objects. In various specific aspects, the method further includes concurrently locating the objects, such as particles, in the single optical path based on the modified shapes of light for each respective wavelength. For example, the objects are labeled in different colors and the locations of the objects are tracked based on the encoded wavelength-based characteristics and three-dimensional positions (x, y, and z).

Various more specific aspects of the present disclosure include an apparatus comprising an imaging circuit, optics, and a phase mask. The imaging circuit is at an image plane in the optical path for detecting light at or incident upon the imaging circuit. The optics pass light from the objects toward the image plane. And, the phase mask is arranged with the optics to modify a shape of light passing along the optical path, passed from the objects. The light passing along the optical path is modified to create a point-spread-function (PSF) for each of a plurality of respective wavelengths of light passed from the objects and along the optical path. The circuit characterizes a three-dimensional image of the objects based on each of the modified shapes of light and the respective wavelengths.

Other specific aspects include axial-related and/or 3D-related microscopic localization of multiple point-like light objects labeled in different wavelengths as generated using wide-field microscopy. In accordance with various aspects 3D (x, y, and z) position information is obtained, even when an object is above or below the focal plane. In other aspects, less than all the 3D information is needed; for example, the axial (z) information alone and/or in combination with some lateral (x or y) information is used instead of the full 3D position information.

According to other aspects, the present disclosure is directed to phase masks that are optimized to create PSFs corresponding to wavelengths expected from target objects and/or to the manufacture and/or use of such phase masks. In some embodiments, the phase mask is placed at the Fourier plane of the optical system to yield a shift-invariant PSF.

In other related embodiments, the present disclosure is directed to a method that includes determining a set of different wavelengths or wavelength ranges for defining voltage patterns for phase mask, and then using an optimization function to provide an optimal voltage pattern applicable to each of the different wavelengths or wavelength ranges and thereby determining an optimal voltage pattern for a desired single phase mask. This phase mask is then characterized by the pattern and used to create PSFs that are sufficiently similar to desired phase masks as though respectively manufactured for each of the different wavelengths or wavelength ranges.

The above discussion/summary is not intended to describe each embodiment or every implementation of the present disclosure. The figures and detailed description that follow also exemplify various embodiments.

BRIEF DESCRIPTION OF THE DRAWINGS

Various example embodiments may be more completely understood in consideration of the following detailed description in connection with the accompanying drawings, in which:

FIGS. 8A-8G illustrate a dual-wavelength phase mask and corresponding point spread functions for two different wavelengths, in accordance with various embodiments;

FIGS. 12A-12B illustrate examples of a light sheet microscope, in accordance with various embodiments.

Figure 1A:
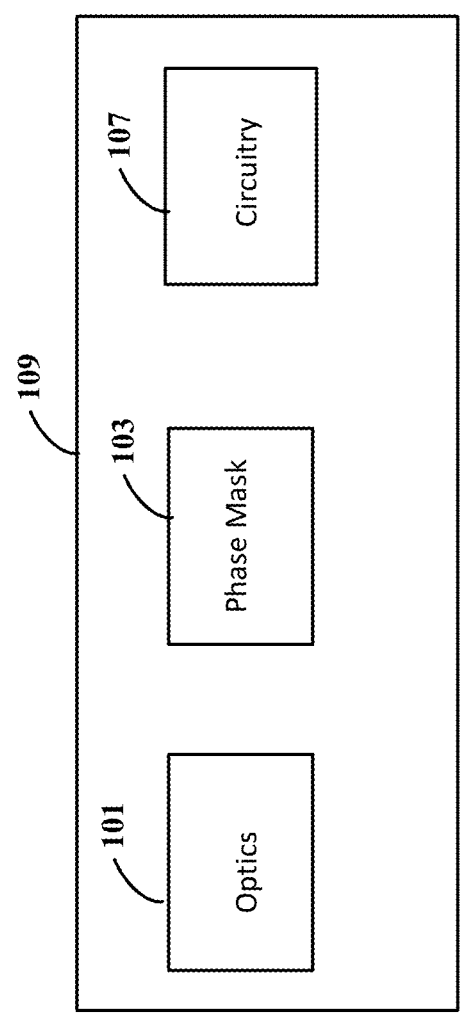
FIGS. 1A-1B illustrate example apparatuses in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving encoding wavelength-based (e.g., color) characteristics and three-dimensional positions of a plurality of objects. For example, the wavelength-based characteristics and three-dimensional positions are encoded by modifying respective point-spread-functions (PSFs) for each wavelength of light passed from the plurality of objects via a phase mask. In certain implementations, aspects of the present disclosure have been shown to be beneficial when used in the context of optical microscopy or with PSFs that vary based on a depth range. While the present invention is not necessarily limited to such applications, various aspects of the invention may be appreciated through a discussion of various examples using this context.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

For particle tracking and/or three dimensional (3D) imaging, the context in which the imaging takes place is often of interest. For example, when tracking a moving emitter in a cell, the motion of the emitter relative to other elements in the cell provides vital information. As another example, a trajectory of a protein, or a structure within a cell, is more informative when it is related to other proteins, organelles, or the cell membrane. In order to track the movement of one object relative to movement of another object, the objects are labeled using different colors. For example, one object is labeled in a first wavelength (e.g., color) and the other object is labeled in a second wavelength that is different than the first wavelength. Certain embodiments in accordance with the present invention include an apparatus with a phase mask that modifies a shape of light for each of a plurality of wavelengths of light passed from objects. The phase mask modifies the shape of light to generate a point spread function (PSF). A single phase mask can simultaneously create different PSFs, one for each wavelength, using a single optical channel and camera/detector and resulting in an increased amount of information and increased simplicity obtainable as compared to other techniques. Such other techniques include additional optical channels (e.g., multiple cameras), sequential imaging, wavelength dispersive optics (e.g., gratings, prisms) and/or dedicated fields of view for each wavelength. For example, for each color being imaged, a dedicated optical channel is used. Each dedicated optical channel requires use of an additional imaging apparatus (e.g., camera) or takes up some of the field of view of a particular imaging apparatus. Further, the imaging apparatus has corresponding special filters or other optics with wavelength-dependent transmission. However, this limits the number of different colors that can be used and thus the amount of information obtainable from the acquired data.

Various embodiments involve super-resolution microscopy. Super-resolution microscopy is a form of light microscopy that allows images to be taken with a higher spatial resolution than the optical diffraction limit. Surprisingly, a number of embodiments of the present disclosure encode spectral information (wavelengths/color) in addition to the 3D position, directly in the image. By exploiting chromatic dispersion, a phase mask simultaneously yields controllably different PSFs for different wavelengths in a single field of view. Further, in various embodiments, objects labeled in multiple wavelengths are simultaneously tracked using super-resolution imaging and a single optical path.

In some specific embodiments, aspects of the present disclosure involve localization of individual objects that are labeled with different wavelengths in optical microscopy. For example, a phase mask is added to a conventional microscope. The phase mask includes a dielectric mask, deformable mirror, or a spatial light modulator (SLM), such as a liquid crystal SLM. A spectral degree of freedom is added to the microscope by modifying a shape of light detected using a phase mask that is in the Fourier plane of the optical path of a microscope. In various embodiments the phase mask is used to encode the wavelength-characteristics and three-dimensional position of multiple observed objects (e.g., particles, emissive molecules, scattering objects).

The phase mask, in various embodiments, exploits the spectral dependence of the light corresponding to different objects and creates different, controllable, phase delay patterns (e.g., PSFs) for different wavelengths. As a result, different wavelengths correspond to different PSFs. The phase mask is designed with a particular thickness such that at any point on the phase mask, the mask produces a different phase delay for respective wavelengths. This occurs by taking advantage of the refractive index change between the mask material (e.g., dielectric material, quartz, deformable air, and liquid-crystal) and air. Accordingly, embodiments in accordance with the present disclosure, involve a single optical channel to simultaneously image multiple, distinguishable objects labeled with different colors and/or objects of different wavelengths. An object, as used herein, corresponds to and/or includes an emitter, such as a particle, a molecule, a cell, a quantum dot, a nanoparticle, etc. Further, multi-wavelength spatial registration is simplified as all wavelengths go through the same optical channel.

In accordance with specific embodiments, aspects of the present disclosure involve 3D super-localization microscopy techniques. Such techniques include tracking single biomolecules with fluorescent labels inside a biological sample, and 3D analysis using other light emitting objects such as quantum-dots or the scattered light from gold beads or nano-rods. Additionally, various embodiments include use of a microfluidic device to characterize flow in 3D.

Other specific embodiments include axial-related and/or 3D-related microscopic localization of multiple point-like light objects labeled in different wavelengths as generated using wide-field microscopy. When a point-like (e.g., sub-wavelength) source of light is positioned at the focal plane of a microscope, the image that is detected on the imaging circuitry, such as a camera and/or a detector, is known as the PSF of the microscope. A conventional microscope's PSF (e.g., essentially a round spot) is used for imaging a two-dimensional (2D) 'slice' of a specimen, and for 2D (x,y) transverse localization of an object within that slice. By fitting the shape of the spot with a 2D function such as a centroid, Gaussian, or Airy function, in some instances, the position of the object can be detected with precision (a process termed super-localization). However, objects that are a small distance above or below the microscope's focal plane can appear blurry, and furthermore, their depth (or axial distance from the focal plane) is difficult to determine from their measured image. In accordance with various embodiments, 3D (x, y, and z) position information is obtained, even when an object is above or below the focal plane. In other embodiments, less than all the 3D information is needed; for example, the axial (z) information alone and/or in combination with some lateral (x or y) information is used instead of the full 3D position information. Using a phase mask, in various embodiments, an additional module is installed on a conventional microscope to solve the blur and depth issues. Instead of a point of light forming a single 'spot' on the camera, light passing through the phase mask forms a shape on the camera that looks different as a function of the object and distance from the focal plane (or amount of defocus).

Various embodiments are directed to an apparatus or method involving encoding wavelength-based characteristics and 3D positions of a plurality of objects of different wavelengths. In specific embodiments, optics pass light from the plurality of objects toward the image plane. A phase mask is used to modify a shape of the light for each of the plurality of respective wavelengths of light passed from the plurality of objects. In a number of specific embodiments, the shape of light for each respective wavelength is different than the shape of the light for other ones of the respective wavelengths. Alternatively, the phase mask modifies the shape such that the resulting shape (e.g., PSF) is the same for each respective wavelength. For example, by providing different phase delays for each wavelength, the phase mask creates a modified shape of light for each wavelength that is different and/or the same. Further, circuitry characterizes a 3D image of the plurality of objects based on each of the PSFs and the respective wavelengths. In specific embodiments, the circuitry is configured to detect relative movement of different ones of the objects based on each of the PSFs and the respective wavelengths.

Certain embodiments in accordance with the present disclosure involve optimizing PSFs with applicable depth ranges far beyond previously obtained ranges having a maximum of 2-3 um. As a specific example, using a phase mask optimized for a particular depth range, super-localization over a customizable depth range is performed up to 20 um for a 1.4 NA objective lens (with other parameter-set limitations, such as magnification, background/signal levels, and noise issues). In specific embodiments, the PSF is used for 3D super-localization and tracking, as well as for 3D super-resolution imaging in biological samples, since this is the applicable depth range used for observing the 3D extent of a mammalian cell. However, embodiments are not so limited and the depth range in various embodiments can be greater than 20 um. The depth range, for example, is a function of system limitations, such as NA objective lens and the light emitted by the object.

Certain PSFs, in accordance with the present disclosure may be referred to as tetrapod PSFs, due to the shape they trace out in 3D space, as a function of the emitter position (the position of the object). In a number of embodiments, the modified shape characterizes the light as having two lobes with a lateral distance that changes along a line, having a first orientation, as a function an axial proximity of the object to the focal plane, and the line having a different orientation depending on whether the object is above or below a focal plane. For example, the different orientation of the line as compared to the first orientation, in various embodiments, includes a lateral turn of the line from the first orientation to the different orientation, such as a 90 degree or 60 degree lateral turn. This shape has lines from the center of a tetrahedron to the vertices, or like a methane molecule. The PSF is composed of two lobes, where their lateral distance from one another and orientation are indicative of the z position of the object. Above the focal plane, the two lobes are oriented along a first line, and below the focal plane the two lobes are oriented along a second line that is differently orientated than the first line (e.g., perpendicular to the first line). For example, the modified shape is created, in various embodiments, by decreasing the lateral distance (e.g., moving together) of the two lobes along the first line when the object is above the focal plane and is closer to the focal plane (e.g., moving closer), turning the two lobes laterally, such as 90 degrees, and increasing the lateral distance (e.g., moving apart) of the two lobes another along the second line when the object is below the focal plane and is further away from the focal plane (e.g., moving away). The tetrapod PSF, as used herein, is not a rotation of a shape of the passing light (e.g., relative to a center line) as a function of the axial position of the object (as with a spiral and/or helix PSF).

Emitter (e.g., object) localization can be optimally performed using maximum likelihood estimation, based on a numerical or experimentally obtained imaging model. However, other localization methods can be used. While other methods for 3D imaging can be used, such methods use scanning (e.g. confocal), in which temporal resolution is compromised, or parallelizing the imaging system (multifocal imaging), which complicates the implementation. Certain embodiments in accordance with the present disclosure do not use a scan or parallelization technique, and include observation of multiple single emitters in a field at high precision throughout depth ranges, such as discussed above.

In accordance with specific embodiments, aspects of the present disclosure involve encoding wavelength (e.g., color) characteristics, in addition to 3D positions, of a plurality of objects by modifying a shape of light for each of a plurality of wavelengths of light passed from the objects and in a single optical path. In specific embodiments, optics pass light from the objects in each of a plurality of wavelengths toward the image plane and the phase mask. The phase mask is used to modify a shape of light, passed from the object. In various embodiments, modifying the shape of light includes redirecting and modifying the light to create a PSF for each of the respect wavelengths simultaneously using the same phase mask.

In various embodiments, the phase mask produces different (or same) shapes of light for the different wavelengths by providing a different phase delay for each of the respective wavelengths. For example, the phase mask modifies the shape of the light by producing a plurality of PSFs for the respective wavelengths of light. The PSF for each respective wavelength is different than the PSF for other ones of the respective wavelengths. For example, the phase mask creates the plurality of PSFs by producing a different phase delay for each respective wavelength. In some embodiments, the circuitry generates an image of a plurality of colors, each of the colors corresponding to one of the wavelengths, on a single optical channel.

The circuitry infers depth information, in addition to the wavelength-based characteristics, about objects that are imaged. In various embodiments, the generated 3D image is indicative of respective depths of objects that are greater than 3 microns of one another.

For a given application, a desired phase mask (e.g., a pattern) for certain different wavelengths (or wavelength ranges) can be designed by way of an optimization function that is used for determining an optimal voltage pattern most applicable to each of the relevant wavelengths. As an example, a minimization function solves for a pixel-wise weighted least squares problem to determine the optimal voltage pattern. The resulting (optimal) voltage pattern (e.g., when placed on an SLM) can be used to create PSFs that are similar to the desired phase masks for each set of different wavelengths/ranges. These ensuing PSFs (output by the voltage pattern) are not necessarily identical to a PSF output by the desired phase masks. The resulting PSFs for each wavelength, however, are similar to the desired phase masks and this relationship can be optimized for a given set of N wavelengths, for example, using an optimization function that minimizes a phase distance between the desired phase mask patterns and the corresponding phase masks.

The phase mask, in some embodiments, is a deformable mirror used to tune the depth characteristic by deforming. For example, the phase mask tunes a depth characteristic to obtain light from the object at different respective depths. In some embodiments, the apparatus and/or method, as described above, includes a tuning circuit used to tune the depth characteristic.

In a number of particular embodiments, an apparatus and/or method in accordance with the present disclosure is used to track objects. For example, an apparatus and/or method is used to localize objects that labeled in different wavelengths, tracking locations of objects and/or particles of a plurality of different colors corresponding to the wavelengths simultaneously, and/or characterizing movement of objects with respect to one another and that are at least 3 microns from one another in the axial direction (and any combination thereof).

Certain embodiments involve adjusting phase mask design parameters to deliver optimal performance for a given depth range. Thereby, the phase mask in accordance with the present disclosure is not as limited in depth range as other depth estimation techniques. A module incorporating a phase mask, in accordance with various embodiments, is installed on an existing microscope (e.g., commercial microscope) in a short period of time, such as less than thirty minutes. A phase mask can allow for a high numerical aperture (NA) implementation for light-sheet-microscopy.

Turning now to the figures, FIG. 1A illustrates an example apparatus 109 in accordance with various embodiments of the present disclosure. In such embodiments, the apparatus 109 creates different PSFs for different wavelengths using a single phase mask 103 and optical channel. The phase mask 103, surprisingly, allows for simultaneous scan-free 3D imaging of objects of different wavelengths on a single optical channel. The PSFs allow for precise localization of nanoscale emitters (e.g., objects) in 3D over customizable axial (z) ranges of up to 20 μm, with a high numerical aperture (NA) objective lens. In some specific embodiments, apparatus 109 is used to track movement of multiple objects relative to one another, such as movement of a protein with respect to movement of other proteins or organelles, simultaneously and in 3D.

An object, as used herein, corresponds to and/or includes an emitter, such as a particle, a molecule, a cell, a quantum dot, a nanoparticle, etc. In various embodiments, a plurality of objects are labeled in and/or emit different wavelengths of light. The plurality of objects are located in a sample and imaged using the apparatus 109, as described herein.

Figure 1B:
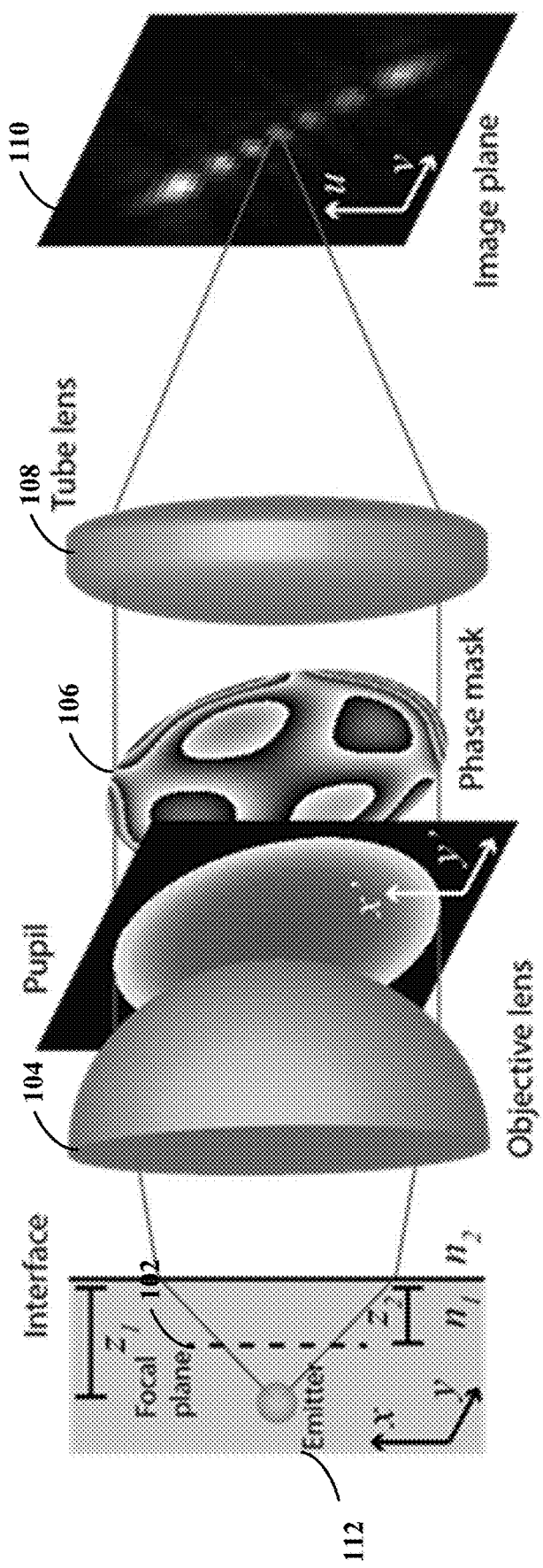
Figure 2:
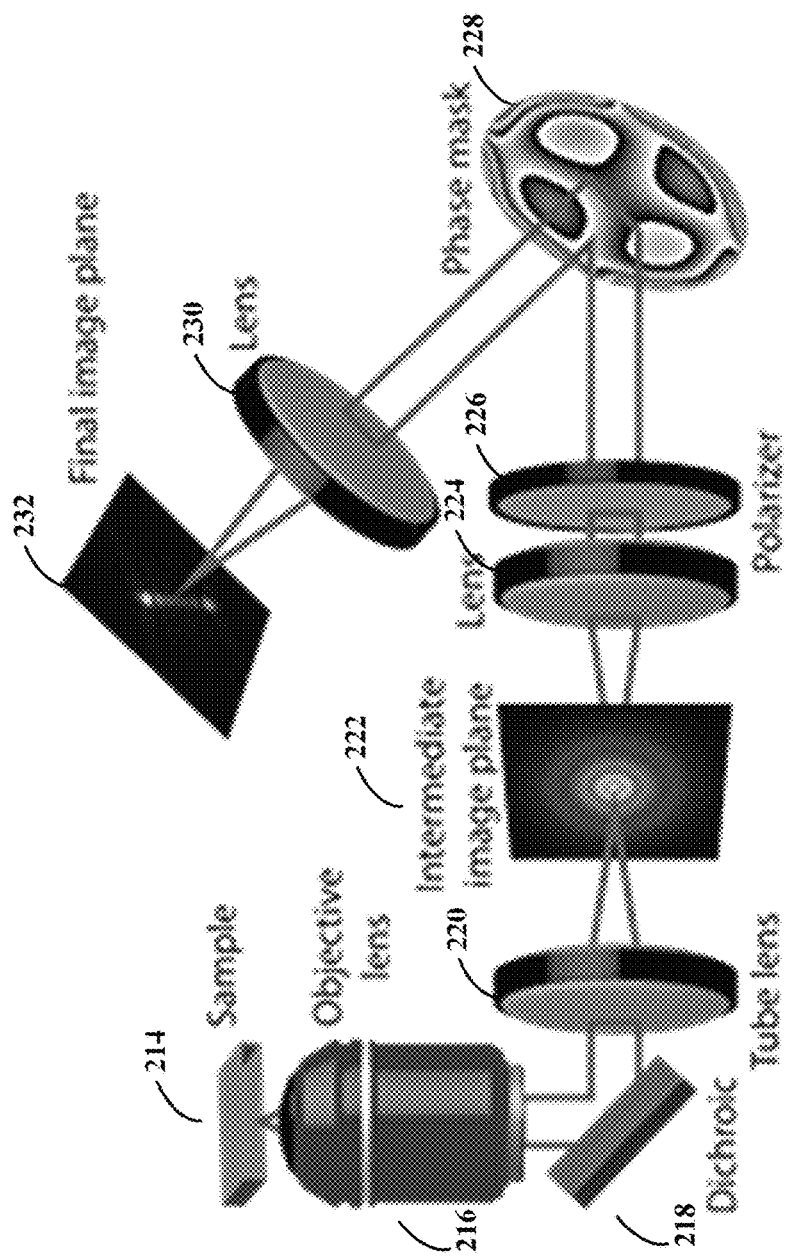
FIG. 2 illustrates an example of an apparatus in accordance with various embodiments.

The apparatus 109 includes a phase mask 103 and circuitry 107. The phase mask 103 is arranged with optics 101 in an optical path. For example, the optical path is from the optics 101 to the phase mask 103 to the circuitry 107. The optics 101 pass light from a plurality of objects toward the image plane. For example, the optics can include the various lenses, as illustrated by FIGS. 1B and 2. The phase mask 103 modifies a shape of the light for each of a plurality of respective wavelengths of light passed from the objects. For example, the objects are of a particular color corresponding to one of the wavelengths and/or are otherwise labeled in the color. The phase mask 103 includes a pattern that produces a different phase delay for the different wavelengths to create the shapes of light for each respective wavelength. For example, the phase mask 103 has an input voltage pattern such that two (or more) wavelengths experience different phase delay patterns resulting in a different modification of light (e.g., different PSF and/or same resulting PSF from different modifications). The phase mask 103 creates the PSF for each respective wavelength based on a distance of the object from the image plane, as discussed further herein. Unlike other optical components including, for example, gratings, shape modification accordingly to the present disclosure includes a phase-delay pattern (e.g., voltage pattern) for this modification. In accordance with a number of embodiments, the phase mask has a pattern that includes two peaks and two valleys, such as a two-dimensional saddle point function with two peaks and two valleys.

In some embodiments, the phase mask 103 modifies the shapes of light by redirecting and modifying light passing along the optical path to create the PSF at or incident upon the image plane for each respective wavelength. The modification is simultaneous for each respective wavelength, independent of one another, and from the same optical path.

In a number of specific embodiments, the PSFs created are different for each wavelength. For example, the phase mask 103 modifies the shape of light for each respective wavelength differently than the shape of light for other ones of the respective wavelengths and resulting in different shapes of light for each wavelength. The different shapes for each respective wavelength are created by the phase mask 103 providing different phase delays for the each of the respective wavelengths. Thereby, the phase mask 103 modifies the shapes of lights to create a plurality of PSFs for the wavelengths of light, the PSF for each wavelength being different than the PSF for other ones of the respective wavelengths. In other specific embodiments, the PSFs created are the same for each wavelength of light. For example, the phase mask 103 modifies the shape of light differently for each respective wavelength, resulting in a PSF for each wavelength that is the same. Modifying the shapes as the same shape, in a number of embodiments, is used for chromatic aberration correction.

The phase mask 103, in various embodiments, is placed in the Fourier plane to modify light in the optical path. For example, the phase mask 103 modifies the shape of light by redirecting and modifying the light passing along the optical path to create a PSF for each wavelength at the image plane (e.g., the circuitry 107). The shape modification includes a shape of light as a function of an axial proximity of the object, such as a tetrapod PSF. In a number of embodiments, the shape of light is characterized by having two lobes with a lateral distance that changes along a line, having a first orientation, as a function an axial proximity of the object to the focal plane, and the line having a different orientation depending on whether the object is above or below a focal plane. In some specific embodiments, the lateral distance decreases as a function of the axial proximity of the object to the focal plane. For example, as the object gets closer to the focal plane, the lateral distance decreases. Similarly, as the object gets farther away from the focal plane, the lateral distance increases.

The phase mask 103 creates such PSFs, in various embodiments, by decreasing the lateral distance (e.g., moving together) of the two lobes along the first line when the object is above the focal plane and is closer to the focal plane (e.g., moving closer), turning the two lobes laterally, such as 90 degrees, and increasing the lateral distance (e.g., moving apart) of the two lobes another along the second line when the object is below the focal plane and is further away from the focal plane (e.g., moving away). The second line is at an angle, based on the lateral turn of the two lobes, to the first line.

The phase mask 103 creates any of a variety of axially-dependent PSFs, where different wavelengths produce different PSFs so that they may be distinguished.

The apparatus 109 further includes circuitry 107 to characterize a 3D image of the objects based on the light detected via the circuitry 107 which includes computational image processing. The circuitry 107 uses the modified shapes of light and the respective wavelengths to provide 3D characteristics (x, y, and z based characteristics) of the objects. The 3D characteristics include the 3D position information and/or an axial dimension (z). For example, the circuitry 107 infers depth of each object of the different wavelengths based upon the PSFs. In various embodiments, the circuitry 107 includes an imaging circuit. The imaging circuit is in the image plane (e.g., the final image plane) and detects light at or incident upon the imaging circuit.

In various embodiments, the circuitry 107 generates the 3D image that is indicative of respect depths of portions of the object that are at least 3 um from one another. For example, the circuitry 107 infers depth of portions of the object based upon a 3D shape of the objects on the image plane and a location of the objects from the modified shape of lights. In various embodiments, the circuitry 107 infers the depth of portions of the object based computational analysis of the image shapes, as discussed further herein.

In a number of embodiments, the circuitry 107 encodes wavelength-based characteristics, in addition to 3D positions, of the objects based on the PSFs created by the phase mask 103. Encoding the wavelength-based characteristics allows for the circuitry 107 to localize the objects labeled in different colors, such as particles, in 3D based on the PSFs. Wavelength-based characteristics, as used herein, is information indicative of an object's emitted wavelength(s) useful for distinguishing the object by its corresponding wavelength(s) for a given application. For example, in various embodiments, wavelength-based characteristics include the wavelength, frequency, emission spectrum, spectrum of the color, resulting phase delay and/or PSF corresponding to the wavelength, among other characteristics indicative of wavelength. In various embodiments, the expected PSFs for each wavelength as created by the phase mask 103 are calculated and the expected shapes of the PSFs are provided as a library (e.g., stored using the circuitry 107). In some embodiments, the expected PSFs for each wavelength include (tetrapod-type) PSFs for various axial z-ranges of the objects.

The circuitry 107 characterizes a 3D image of the objects from light detected. For example, the circuitry 107 concurrently localizes the plurality objects in the single optical path based on the modified shapes of lights for each respective wavelength. The localization includes three-dimension locations (e.g., x, y, and z). Concurrent localization, in some embodiments, includes tracking locations of the objects of a plurality of colors, each color corresponding to one of the wavelengths. As a specific example, locations of the objects in 3D are tracked by the circuitry 107 (and using a single optical channel) over a period of time and simultaneously based on the encoded wavelength-based characteristics and the modified shapes of light. As another specific example, the circuitry 107 concurrently tracks 3D locations of two particles that are labeled using different colors using the encoded wavelength-based characteristics.

In various embodiments, the phase mask 103 tunes the depth characteristics to obtain light from the object at different respective depths. For example, the apparatus 109 includes a tuning circuit that manipulates the phase mask 103 to tune the depth characteristics. In such embodiments, the phase mask 103 includes a deformable mirror configured to tune the depth characteristics. A deformable mirror includes a mirror face-sheet that is attached to an array of post and an actuator array. For example, each post is centered an actuator array. The actuator array includes a flexible cantilever that is suspended over an actuator electrode. Further, the entire mirror face-sheet and actuator array is fabricated on a silicon wafer, in various embodiments. For more specific and general information regarding a deformable mirror, reference is made to Appendix C of the underlying provisional entitled "Appendix C", which is fully incorporated herein by reference.

A number of embodiments include a family of (tetrapod-type) PSFs. The specific phase mask design (corresponding to a certain PSF from the tetrapod family) is dependent on the apparatus parameters, mainly on the depth range. For different imaging apparatus parameters (magnification, numerical apertures, etc.), the phase mask 103 is optimized using an optimization routine, as discussed further herein. For example, the phase mask 103 yields slightly different phase mask patterns for a respective wavelength depending on the axial position of the object associated with the wavelength. Related embodiments in accordance with the present disclosure utilize PSF engineering to provide optimized, high-precision localization capability, for a large depth range. For example, such a phase mask design can yield a depth range of 2-20 um for a 1.4 NA objective lens (with other parameter-set limitations, such as magnification, background/signal levels, and noise issues). In some embodiments, the tetrapod PSF is tailored and optimized to a specific depth range, which is dependent on and/or defined as a function of the information encoded in the PSF, as well as the NA objective lens and the light emitted by the object. Surprisingly, it has been discovered, with such a tetrapod-type PSF, the information for a given amount of light emitted by an object and for a given NA objective lens has a significantly greater precision than other PSFs, although other PSF designs (not illustrated by the specific examples disclosed herein) can be used for implementing this invention In some embodiments, a number of functions (e.g., equations and algorithms) for specifying the exact design of a phase mask 103 (e.g., parameterized phase mask) are used based on the system parameters of a given imaging application. In addition, in various embodiments, the localization of an emitter given a measured image of the PSF is performed using maximum-likelihood-estimation. In a number of embodiments, a module (e.g., computer-readable code) is executed by the circuitry 107 of the apparatus 109 to perform both of these actions, including the imaging model (as discussed further herein). At the same time, a set of phase masks is calculated to produce tetrapod PSFs for various fixed z-ranges, and the expected shapes of the PSFs are provided as a library (e.g., stored using the circuitry 107). In accordance with various embodiments, no calculation is required by the user except to perform fitting of the acquired images using interpolation of images from the library. Although embodiments are not limited to tetrapod PSFs and in various embodiments the library include expected PSFs for other example PSFs.

FIG. 1B illustrates an example apparatus in accordance with various embodiments. As illustrated, the apparatus includes a modified microscope. The apparatus includes a phase mask 106 that is installed in an optical path (e.g., detection pathway) of the microscope. Phase masks, in accordance with various embodiments, allow for precise 3D localization of multiple objects (e.g., emitters) labeled in different wavelengths over a customizable depth range. The customizable depth range, in some embodiments, is up to 20 um for a 1.4 numerical aperture (NA) objective lens. The phase mask 106, in various embodiments, is used to simultaneously track the location of the multiple objects, in the different wavelengths, at different depths, allowing scan-free high speed imaging.

As illustrated, the apparatus includes an optical path that includes optics 104, 108 configured to pass light from objects 112-1, 112-2 from an object plane 102 toward an image plane 110. The objects 112-1, 112-2 are labeled in different colors corresponding to different wavelengths of lights. In various embodiments, the wavelengths are separated by at least 60 nanometers (nm) from one another (e.g., 540 nm and 600 nm), although embodiments are not so limited. A phase mask 106 is arranged with the optics 104, 108 to modify the shape of light passed from the objects 112-1, 112-2. For example, in some embodiments, the phase mask 106 is positioned between the objective lens 104 and a tube lens 108.

Such circuitry can be located at the image plane 110 for generating a 3D image from light detected at the image plane 110 using the modified shape to provide depth-based characteristics of the object 112. The circuitry, in various embodiments, includes imaging circuitry. The imaging circuitry is circuitry commonly used with digital signal image processing (such image circuitry includes, e.g., a charge-coupled device (CCD), image sensors based on field-effect technology such as CMOS image sensors, and the like).

FIG. 2 illustrates an example apparatus in accordance with various embodiments. As illustrated, the apparatus includes a modified microscope. The apparatus of this example apparatus is a standard (inverted) microscope, augmented by a 4f optical processing system. The PSF of the microscope is modified from that of a standard microscope by controlling the phase of the electromagnetic field in the Fourier plane of the 4f system using a phase mask 228. In various embodiments, the PSF is modified for each wavelength of light using the phase mask 228, which is placed in the Fourier plane of the microscope. The phase mask 228, in various embodiments, includes a (dielectric) phase mask or a liquid crystal-based spatial light modulator (SLM).

As indicated above, the placement of the phase mask in the Fourier plane can be advantageous. At this location, the phase function produced by the phase mask multiplies the Fourier transform of the image. This means that the operation of adding the mask works throughout the field of view. In this context, all single-emitter spots get the new PSF (this is referred to as shift invariance). If the mask is placed elsewhere, something else will happen and the PSF would vary across the field of view. The Fourier plane is also sometimes referred to as the "back focal plane" and "pupil plane" because both of these are conjugate to the Fourier plane.

As illustrated by FIG. 2, the apparatus includes an optical path. The optical path is from the objects in the sample 214 to the image plane 223. The optical path illustrated in the example of FIG. 2 includes the following optics/planes configured to pass light from the objects toward the final image plane 223: objective lens 216, dichroic element 218, tube lens 220, intermediate image plane 222, lens 224, polarizer 226, phase mask 228, and lens 230. The optics include one or more focusing lenses (e.g., the objective lens 216) and a light source to illuminate an object 214. Various other focusing lenses (including the other illustrated lenses of FIG. 2 can be used to focus the light, after interacting with the objects, to the final image plane for detection by circuitry. The phase mask 228 can be located between the intermediate image plane 222 and the final image plane 232, in various embodiments. For example, the phase mask 221 is placed in the back focal plane of the illustrated optics and input focal plane of other optics. Once implemented, an apparatus, consistent with that shown in FIG. 2, can be used to accomplish 3D imaging of objects, and encode wavelength-based characteristics including the axial position of the objects.

The phase mask 228, in some embodiments, is placed in between the two optics 224/230. The phase mask in various embodiments is a dielectric phase mask, a SLM, a hologram, a computer-generated hologram, a diffractive optical element, a volume optical element, or the like. The phase mask may have one or both of amplitude and phase components. The mask 228 may be static or dynamic, based upon the scene being imaged, system requirements, or user requirements. The mask 228 may be implemented with a spatial light modulator which manipulates the phase and/or the amplitude of the light. Examples of such masks include those constructed from liquid crystals or from micro-electromechanical systems. Further, a physical mask can also be fabricated, for example, by electron beam lithography, proportional reactive ion etching in $SiO_2$, hot embossing in PMMA, gray level lithography, multistep photolithography, or direct laser writing.

The light source in a number of embodiments includes a coherent light source. The coherent light source may include, for example, an Argon ion laser operating at 488 or 514 nm, or a diode laser emitting at 532 nm or 641 nm. Other lasers operating at various wavelengths may also be used as sources of coherent light. The light source may produce monochromatic or polychromatic light. The optics expand or reduce the laser beam so that it illuminates a region of interest of the objects. These optics may also be supplemented by polarizers 226, waveplates, or diffusers in order to manipulate the polarization or coherency of the light illuminating the object. Other light sources that produce incoherent light, such as an arc lamp, may also be used. The focus elements may comprise, for example, coated achromatic lenses with 150 millimeter (mm) focal length and an aperture of 50 mm. However, these focus elements may be of different focal lengths in order to accomplish beam expansion or reduction. Various other lenses or optical components may also be included in order to focus light from the object onto the detector.

The circuitry, in various embodiments, encodes a wavelength-based characteristic of a plurality of objects by modifying a PSF for each wavelength at the circuitry using a phase mask. The circuitry additionally encodes axial position of each of the objects using one or more parameterized phase masks. For example, the one or more parameterized phase masks are optimized for a target depth-of-field range for an imaging scenario. The apparatus, for example, provides a target depth-of-field of greater than 2 um and up to at least 20 um for a 1.4 NA objective lens. The depth range of the PSF is dependent on and defined as a function of the information encoded in the PSF, as well as the NA objective lens and the light emitted by the object. Surprisingly, it has been discovered that with a (tetrapod-type) PSF, the information for a given amount of light emitted by an object and for a given NA objective lens has a greater precision than other PSFs. Encoding an axial position in various embodiments includes localizing multiple particle in 3D based on the modified PSFs for each wavelength corresponding to a respective particle (e.g., a tetrapod PSF), and/or tracking locations of the multiple particles simultaneously based on the encoded axial position.

Figure 3B:
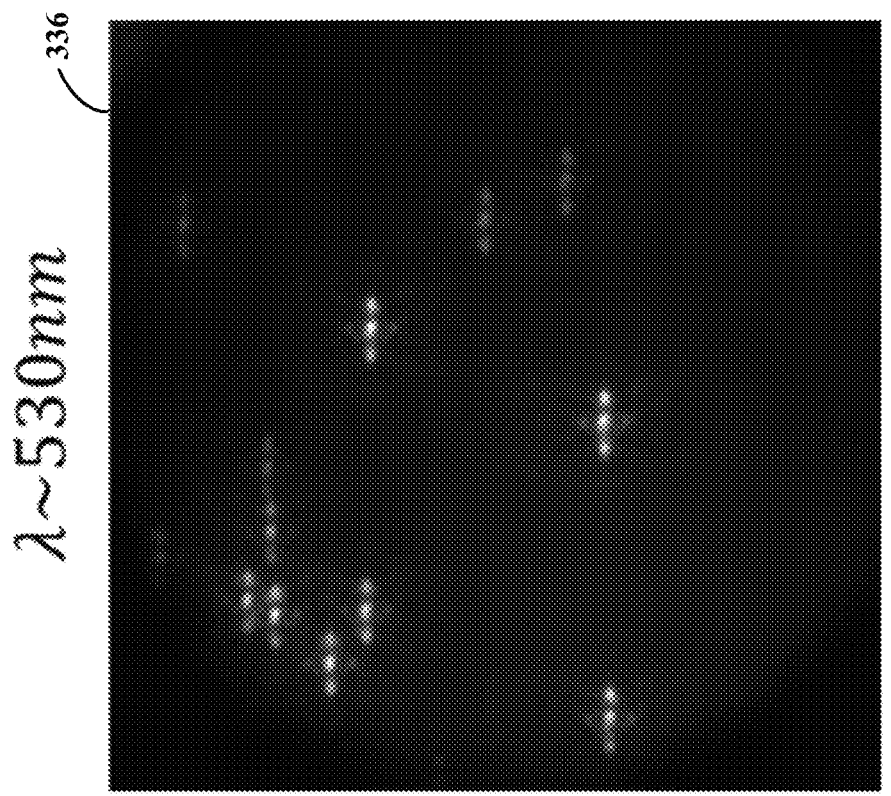
FIGS. 3A-3B illustrate an example of fluorescent beads imaged using an apparatus, in accordance with various embodiments.
Figure 3A:
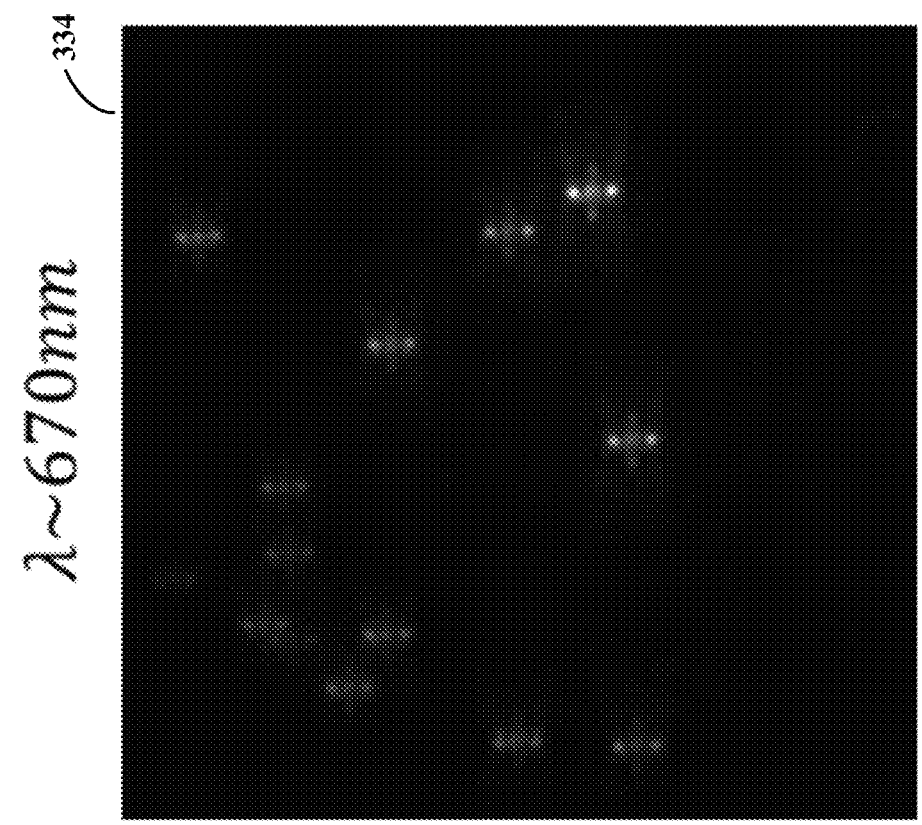

FIGS. 3A-3B illustrate an example of fluorescent beads imaged using an apparatus, in accordance with various embodiments. In accordance with various embodiments, using the above described imaging apparatus with PSF engineering (e.g., the 4f optical system with phase mask in the Fourier plane), a pattern is designed that simultaneously produces a PSF for each of a plurality of different wavelengths of light. Such embodiments allow for simultaneous scan-free 3D imaging of objects with different wavelengths using a signal optical channel (e.g., a single camera/detector).

Such embodiments are implemented by using a phase mask, such as a dielectric phase mask and/or a liquid crystal SLM. The phase mask has a thickness such that at any point on the phase mask produces a different phase delay for different wavelengths. This is performed by taking advantage of the refractive index change between the material the phase mask is formed of (e.g., quartz) and air. In some embodiments, the phase mask includes an SLM. In such embodiments, different phase delays are from the spectral dispersion properties of the SLM.

For example, FIGS. 3A-3B illustrates measurements of fluorescent beads (e.g., tetraspeck spheres), taken with different light sources (e.g., excitation laser) and emission filters, but using the same designed pattern on the phase mask (e.g., an SLM). The fluorescent beads are in focus (e.g., z=0) such that the reason they appear to have different shapes (vertical spots v. horizontal spots) is because they are emitting at different wavelengths. FIG. 3A illustrates an image 334 generated using a phase mask of fluorescent beads that are labeled in a wavelength of 670 nm. FIG. 3B illustrates an image 336 generated using the phase mask of the same fluorescent beads but that are labeled in a wavelength of 530 nm. That is, the images 334, 336 are of the same beads that are images using the same phase mask that appear different due to being labeled at different wavelengths and thus emitting light at the different wavelengths.

In some embodiments, the phase mask includes a liquid-crystal SLM. A liquid-crystal SLM translates an input voltage pattern into a phase-delay pattern. For example, as discussed below, FIG. 4 illustrates a voltage pattern used to produce data illustrated by FIGS. 3A-3B.

Figure 4:
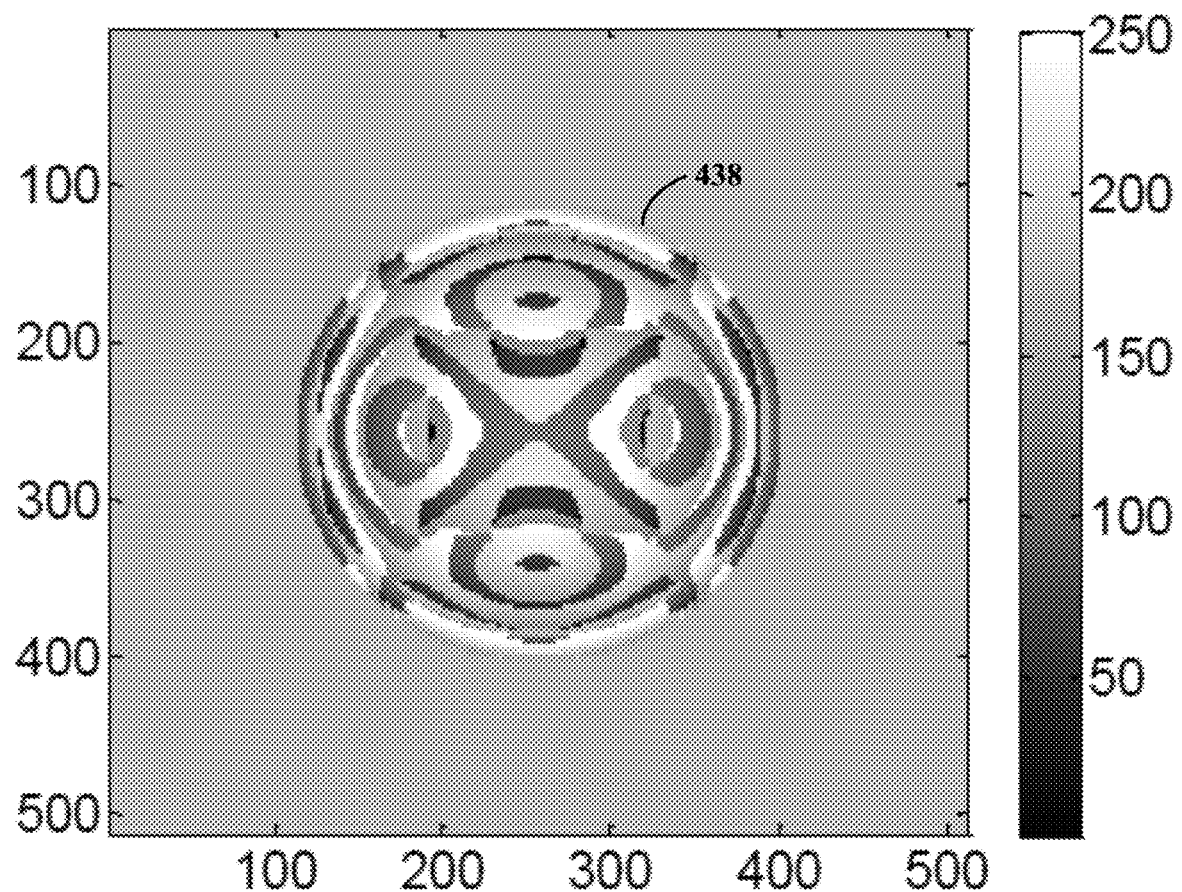
FIG. 4 illustrates an example of a phase mask in accordance with various embodiments.

FIG. 4 illustrates an example of a SLM voltage pattern 438 in accordance with various embodiments. The voltage pattern 438 applied to the SLM creates two phase patterns, one for each wavelength, to produce the images of FIGS. 3A-3B. The gray level represents the possible range of 256 input voltages on a SLM, although embodiments in accordance with the present disclosure are not limited to 256 input voltages and can include input voltages that are greater or less than 256.

Multi-wavelength phase masks, in various embodiments, include more wavelengths and objects than illustrated by FIGS. 3A-4. For example, various embodiments include two to ten objects that are labeled using different colors, each of the different colors corresponding to a different wavelength, resulting in two to ten desired PSF responses. For example, FIGS. 5A-5B illustrate a 32 gray level dielectric phase mask, designed to produce four different PSFs for four different wavelengths.

Figure 5A:
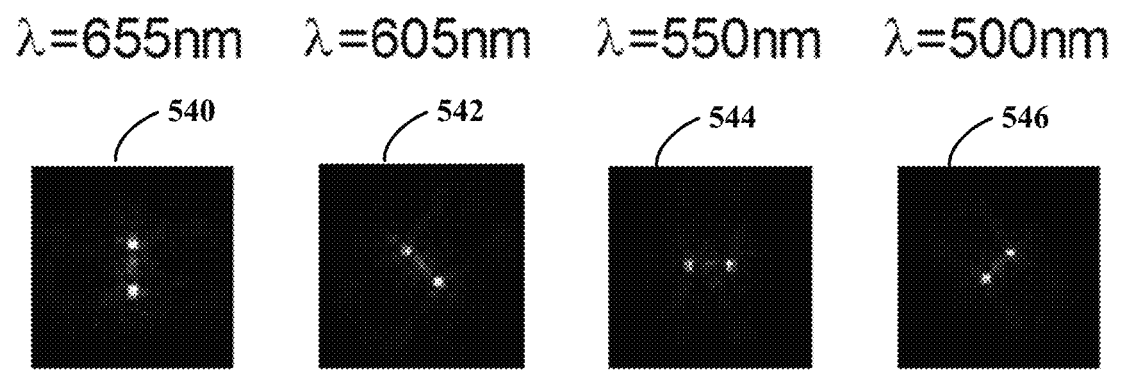
FIGS. 5A-5B illustrate an example phase mask and point spread functions for different wavelengths created using the phase mask, in accordance with various embodiments.
Figure 5B:
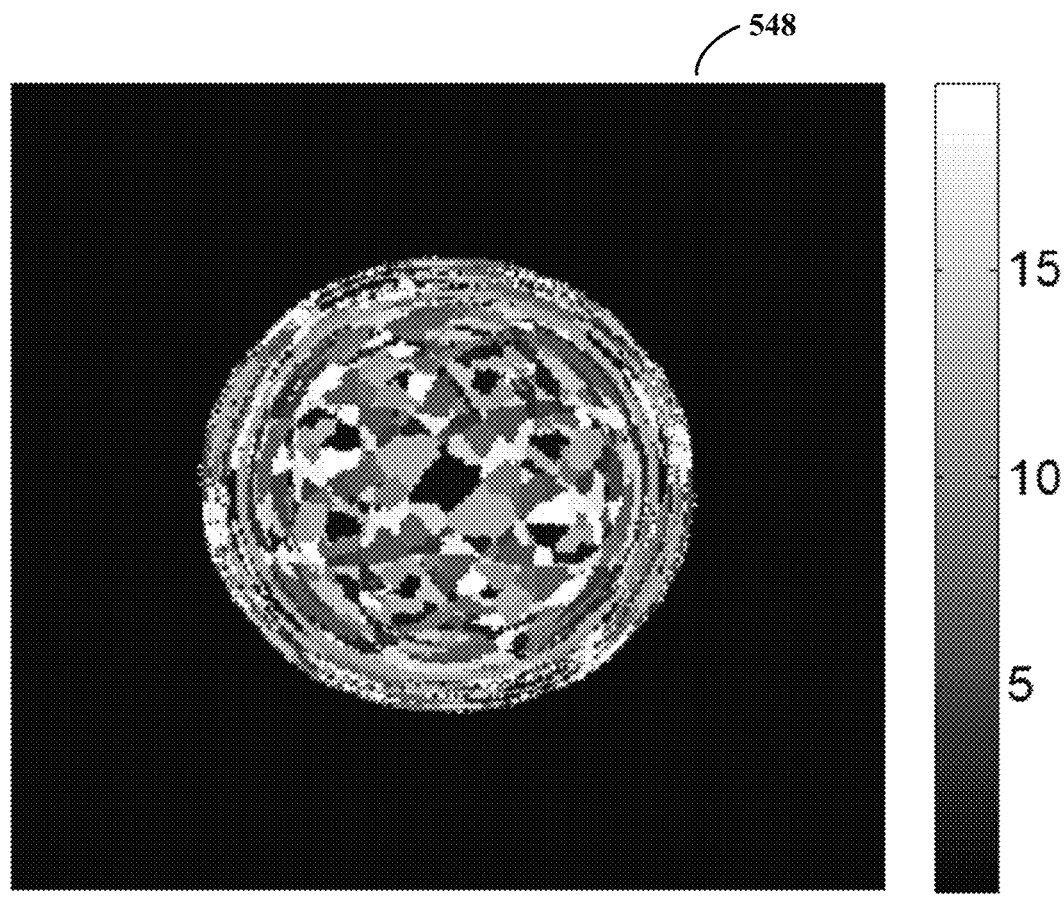

FIGS. 5A-5B illustrate an example phase mask and PSF for different wavelengths created using the phase mask, in accordance with various embodiments. FIG. 5A illustrates the PSFs 540, 542, 544, 546 generated for four different wavelength ranges (e.g., 655 nm, 605 nm, 550 nm, and 550 nm, respectively) by the phase mask 548, all at z=0. FIG. 5B illustrates the phase mask 548 (e.g., a 32 gray level dielectric phase mask pattern) designed to create the four different PSFs 540, 542, 544, 546 for four different wavelengths.

In various embodiments, the phase mask 548 is capable of providing 3D images (x, y, and z information) using the PSFs 540, 542, 544, 546. That is, each PSF for a particular wavelength changes its shape as a function of the z position of the object, similar to a single-color phase mask that creates a tetrapod PSF. The applicable z-range of a multi-wavelength phase mask may be smaller than that of a single-color phase mask, in some embodiments, in order to avoid ambiguities between different wavelengths at different z values. For example, in some embodiments, the z-range of the multi-wavelength phase mask is split between the different wavelengths.

Alternatively, in some embodiments, the multi-wavelength phase mask is not a tetrapod phase mask (e.g., is not similar to the single-wavelength phase mask, as described in further detail by the underlying Provisional Application (Ser. No. 62/146,024) and the corresponding Non-Provisional Application entitled "Apparatuses and Methods for Three-dimensional Imaging of an Object" filed on the same day as the present application and claiming benefit to the same underlying Provisional Application). For example, the PSF for the different wavelengths can be general, as illustrated by FIG. 6.

Figure 6:
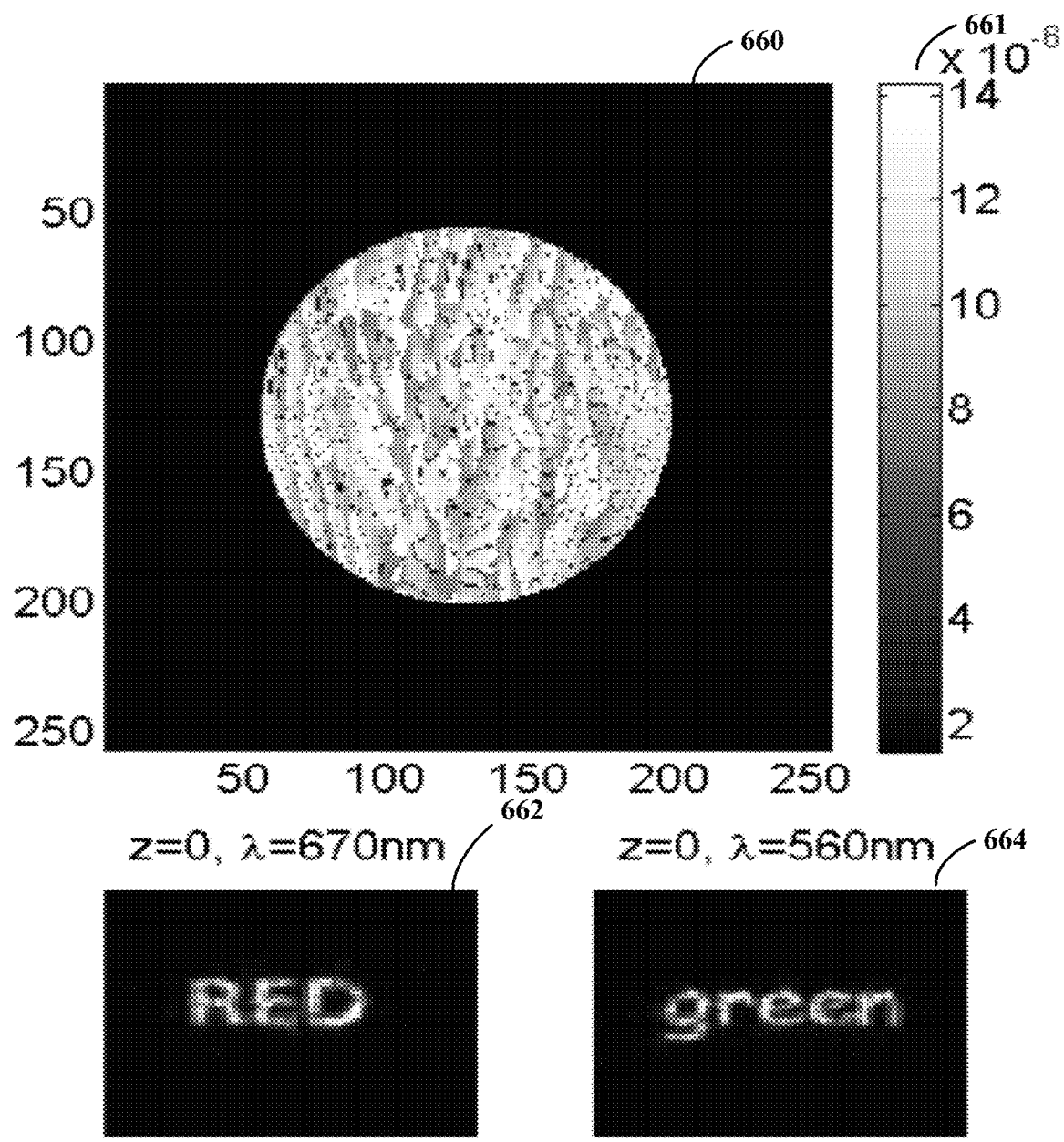
FIG. 6 illustrates an example phase mask, in accordance with various embodiments.

FIG. 6 illustrates an example phase mask, in accordance with various embodiments. The phase mask 660 (e.g., pattern) illustrated by FIG. 6 includes a dual-wavelength phase mask. A dual-wavelength phase mask, as used herein, includes a phase mask configured to create modified shapes of light (e.g., PSFs) simultaneously for two different wavelengths of light using a single optical channel. As illustrated, the modified shapes of light 662, 664 resulting from the phase mask 660 for an object emitting red (e.g., wavelength of 670 nm) appears as the word red and an object emitting green (e.g., wavelength of 560 nm) appears as the word green. The gray levels 661 represent etching depth in quartz, in units of microns. The phase mask 660 results in two PSFs at z=0 that correspond to the two different wavelengths (e.g., red and green).

Figure 7A:
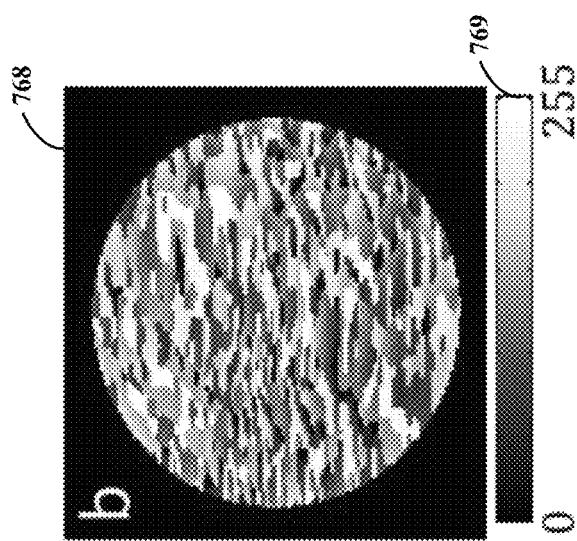
FIGS. 7A-7D illustrate examples of a dual-wavelength phase mask, in accordance with various embodiments.
Figure 7B:
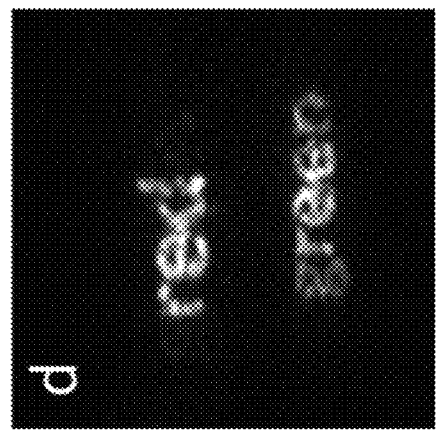

FIGS. 7A-7D illustrate an example of a dual-wavelength phase mask, in accordance with various embodiments. For example, FIG. 7A includes a graph that illustrates a phase delay versus voltage for two different wavelengths of 559 nm depicted as 766 (e.g., green) and 669 nm depicted as 767 (e.g., red). The differences of the phase delay versus voltage between the two wavelengths arise, for example, from the spectral dependency of the phase mask. Based on these relations, an input voltage pattern is applied to the SLM phase mask as illustrated by FIG. 7B. FIG. 7B illustrates the voltage pattern mask 768 which will produce different phase responses illustrated by FIG. 7A. The voltage pattern 768 is illustrated in an 8-bit gray scale 769, although embodiments are not so limited. The voltage pattern 768 applied to the SLM modifies shapes of lights for the two different wavelengths by different phase delays and results in two different PSFs.

Figure 7C:
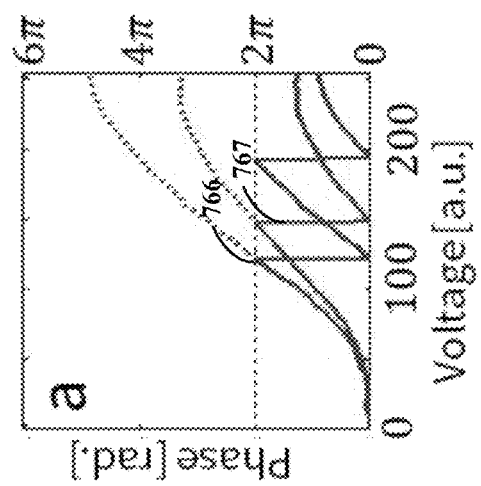
Figure 7D:
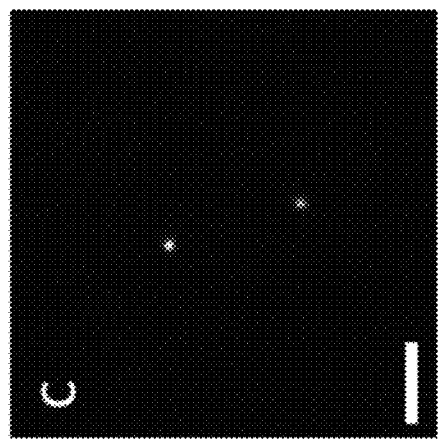

FIG. 7C illustrates an image of two in-focus (z=0) fluorescent objects (e.g., microspheres) with peak emission wavelengths of 559 nm and 699 nm when the voltage pattern 768 is not used and/or is turned off. FIG. 7D illustrates the same two fluorescent objects imaged using the SLM voltage pattern shown in FIG. 7B. As illustrated, by using the voltage pattern 768, the resulting PSFs are wavelength dependent, where the PSFs from the two objects spell out the words "red" and "green" respectively (corresponding to the plots depicted at 766 and 767 of FIG. 7A). The scale bar of FIGS. 7C-7D includes 5 um.

The resulting PSFs, for multi-wavelength applications, are not limited to that illustrated by FIG. 7D. For example, PSFs that encode the axial position are beneficial for a variety of applications. There are various ways to distinguish between wavelengths, since the phase delay experienced by the different wavelengths is directed differently, in various embodiments, thus giving design freedom. For example, various embodiments include optimizing the phase mask for multi-wavelength for multiple object tracking and/or super-resolution imaging. Each application uses different PSF designs.

For certain applications the above-disclosed approaches are used for characterizing different wavelength-distinguishable objects. As an example, such applications are realized through methods and systems that are applied and useful where the distinguishable objects are closely related at a molecular level as indicated by their light emissions. Thus, where a phase mask has been optimized for one of the objects, the resulting PSF would be slightly-less than optimized for the closely-related molecular object. By recording and tabulating the correlations between the (varied) PSFs and different closely-related molecular objects, identification and differentiation is realized for entire classes of such closely-related objects. Among other uses of such information is the ability to define by optimization as disclosed herein phase mask specific to these closely-related objects.

More Specific/Experimental Embodiments

Figure 8C:
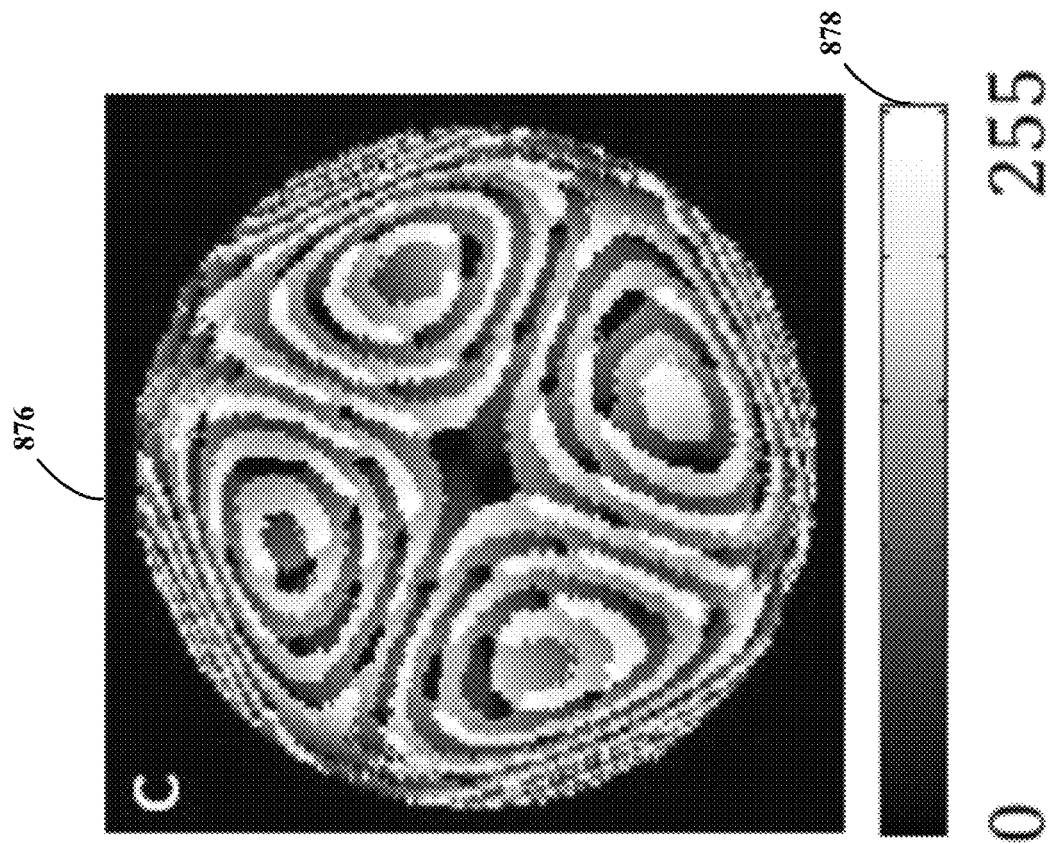

FIGS. 8A-8G illustrate a dual-wavelength phase mask and corresponding PSFs for two different wavelengths, in accordance with various embodiments. The voltage pattern 876, as illustrated by FIG. 8C, is designed for multi-wavelength 3D localization over a depth range of between 2-20 um (and beyond). The resulting SLM voltage patter 876 creates a tetrapod PSF. In accordance with a number of embodiments, a (tetrapod-type) PSF is a characterization of light having two lobes with a lateral distance that changes along a line, having a first orientation, as a function of an axial proximity of the object to the focal plane, and the line having a different orientation depending on whether the object is above or below a focal plane. In related embodiments, the tetrapod PSF is composed of two lobes, where their distance and orientation are indicative of the z position of the emitter. Above the focal plane, the two lobes are oriented along a first line, and below the focal plane the two lobes are oriented along a second line that is at an angle (e.g., perpendicular) to the first line. For example, the modified shape is created, in various embodiments, by decreasing the lateral distance (e.g., moving together) of the two lobes along the first line when the object is above the focal plane and is closer to the focal plane (e.g., moving closer), turning the two lobes laterally, such as 90 degrees, and increasing the lateral distance (e.g., moving apart) of the two lobes another along the second line when the object is below the focal plane and is further away from the focal plane (e.g., moving away).

As described above, a feature of the tetrapod PSF is two lobes that vary in separation as function of the object depth. The axis along which the lobes separate rotates a particular lateral degree, such as 90 degrees, depending on whether the object is above or below the focal plane. The applicable z-range of a tetrapod PSF is 2-20 um for a 1.4 NA objective lens. To distinguish between two wavelengths, the second PSF, in various embodiments, is rotated by 45 degrees as illustrated by FIGS. 8A-8G.

Figure 8A:
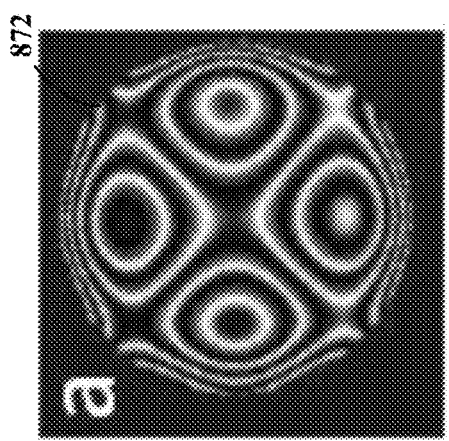
Figure 8B:
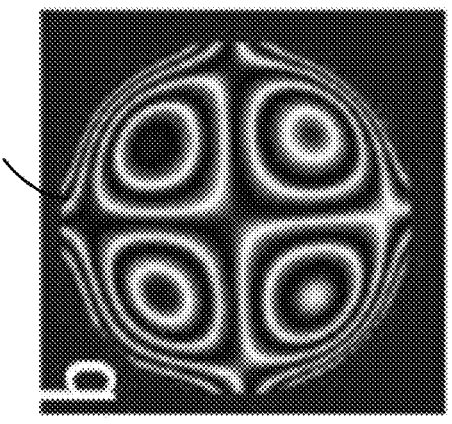

FIG. 8A illustrates a desired phase mask 872 (e.g., a pattern) for a 669 nm wavelength (red) and FIG. 8B illustrates a desired phase mask 874 for a 559 wavelength (green). The desired phase masks 872, 874 are input to an optimization function to solve for a pixel-wise weighted least squares problem to determine the optimal voltage pattern. FIG. 8C illustrates the resulting voltage pattern 876 (e.g., the optimal voltage pattern). The resulting voltage pattern 876 when placed on the SLM creates PSFs that are similar to the desired phase masks for each wavelength. The PSFs output by the voltage pattern 876 are not identical to PSF output by the desired phase masks 872, 874 as a compromise is found using the optimization function for both wavelengths. However, as illustrated by FIGS. 8D-8G, the resulting PSFs for each wavelength 880,882 are similar to the desired phase masks 872, 874.

An example optimization function includes for a given set of N wavelengths $\lambda_i$, i=1 . . . N and N corresponding desired phase mask patterns $D(x, y)_i$, i=1 . . . N, a voltage pattern V (x, y) is sought that minimizes a weighted least squared phase distance between all N desired phase mask patterns and the corresponding phase masks. The following pixel-wise optimization is performed:

$$v_{xy} = \arg\min \Sigma_{i=1}^{N} w_i \cdot \text{Dist}_{2\pi}(P_i(v_{xy}), D_{xy,i})^2,$$

Where $P_i(v)$ is the phase delay that wavelength $\lambda_i$, experiences when voltage v is set on the phase mask pixel, and the phase distance function is defined as:

$$\text{Dist}_{2\pi}(a, b) = 2\pi \cdot \left| \frac{a-b}{2\pi} - \left[ \frac{a-b}{2\pi} \right] \right|.$$

Further, since the addition of a contact phase to a desired phase pattern is allowed, the degree of freedom is optimized.

FIG. 8D illustrates a calculated phase delay 880 (e.g., a PSF) experienced by a wavelength of 699 nm using the phase mask 876. FIG. 8F illustrates PSFs created for a 40 nm red microsphere in a 20 um z-range at the top and theoretically desired at the bottom. For example, the PSFs 883-1, 883-2, 883-3, 883-4, and 883-5 are created using the SLM voltage pattern 876 in response to the red microsphere having a z-position of −10 um, −3 um, 0 (e.g., in focus plane), 3 um, and 10 um respectively.

FIG. 8E illustrates a calculated phase delay 882 (e.g., a PSF) experienced by a wavelength of 559 nm using the voltage pattern 876. FIG. 8G illustrates PSFs created for a 40 nm green microsphere in a 20 um z-range at the top and theoretically desired at the bottom. For example, the PSFs 885-1, 885-2, 885-3, 885-4, and 885-5 are created using the SLM voltage pattern 876 in response to the red microsphere having a z-position of −10 um, −3 um, 0 (e.g., in focus plane), 3 um, and 10 um respectively.

In various embodiments, a phase mask pattern is designed to simultaneously track different colored objects in 3D as the objects randomly diffuse in solution, such as water with around 55 percent sucrose. FIGS. 9A-D illustrate such a design.

Figure 9B:
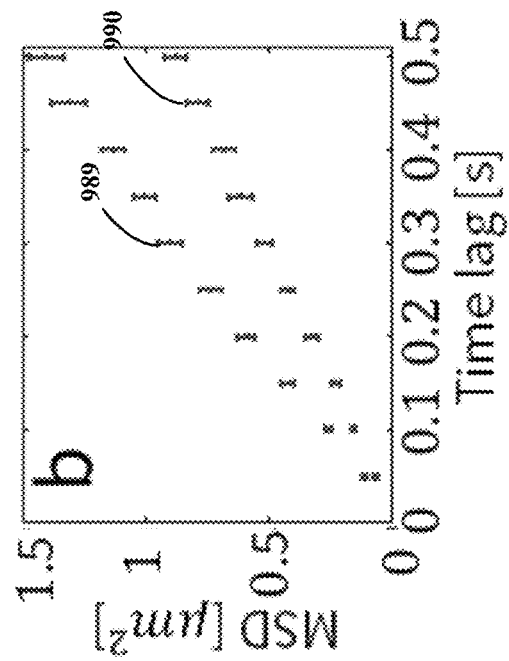
FIGS. 9A-9D illustrate an example of three dimensional localization of two differently labeled objects using a multi-wavelength phase mask, in accordance with various embodiments.
Figure 9A:
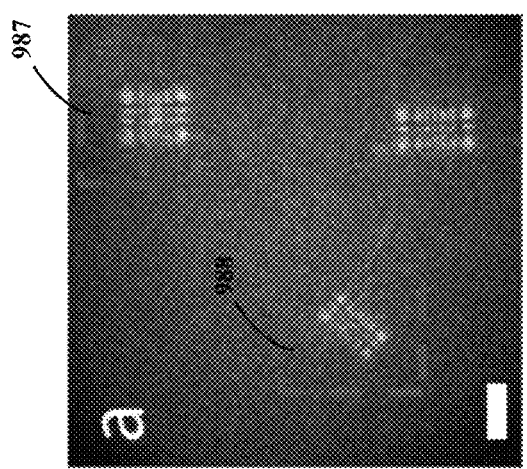
Figure 9D:
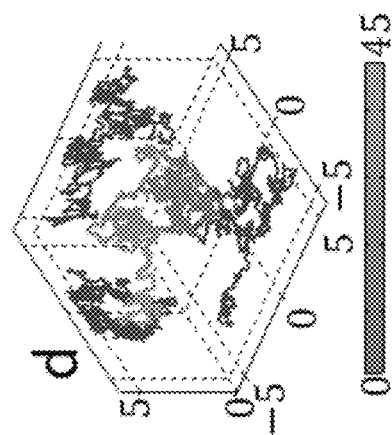
Figure 9C:
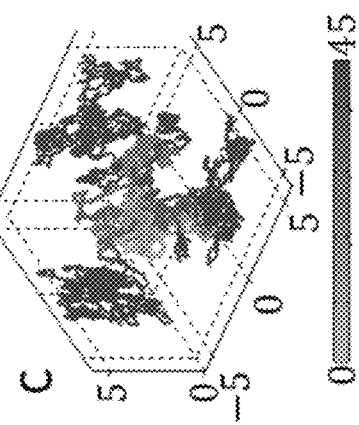

FIGS. 9A-9D illustrate an example of 3D localization of two differently labeled objects using a multi-wavelength phase mask, in accordance with various embodiments. For example, FIG. 9A illustrates an example 50 millisecond movie frame with a red microsphere 987 and a green microsphere 988. The phase mask is used to generate the image, in various embodiments, by creating a tetrapod PSF with a 45 degree rotation between the two colors as previously illustrated by FIGS. 8A-8G. As the microspheres 987, 988 diffuse freely, they are tracked for a period of time, such as 45 seconds. In each frame, the microspheres 987, 988 are localized using a maximum likelihood estimation (MLE) fitting to a numerical PSF model. In some embodiments, two trajectories, one for each microsphere, are obtained. FIG. 9B illustrates the mean-squared displacement curves (MSD) for the microspheres 987, 988. For example, the red microsphere 987 corresponds to the MSD 989 and the green microsphere 988 correspond to the MSD 990. FIG. 9C illustrates a 3D trajectory of the red microsphere 987 and FIG. 9D illustrates a 3D trajectory of the green microsphere 988. The axes units are in um (e.g., scale bar in 5 microns) and the grey scale encodes time in seconds.

From the MSD curves 989, 990, the diffusion coefficient of each microsphere 987, 988 is obtained in a number of embodiments. The ratio between the measured coefficients ($D_{red}$=0.52±0.045 um$^2$/s, $D_{green}$=0.27±0.023 um$^2$/s) corresponds to theory, as D scales like the inverse of the radius in the Einstein-Smoluchowski relation: experimental $D_{green}/D_{red}$=0.52±0.09 um$^2$/s and theoretical $D_{green}/D_{red}$=0.48±0.009 um$^2$/s. The average localization precision per frame, obtained by localizing immobilized microspheres under similar imaging conditions is (20, 24, 45) nm for the green microsphere 988 (for an 18,000 average detected signal photons per frame) and (12, 13, 39) nm for the red microsphere 987 (for an average of 34,000 detected signals photons per frame).

In various specific embodiments, diffusion is carried out in a 55% (w/v) sucrose aqueous solution. For example, two cover glass slides are adhered with doubled sided tape to form a diffusion chamber of approximately 50 um in height. A dilute concentration of fluorescent microspheres is added to the solution and allowed to diffuse at room temperature.

The freedom in designing multi-wavelength phase masks enables many applications. For example, specific embodiments involve tracking 3D particles that are differently labeled, such as differently-color-labeled biomolecules that are interacting and known to be in proximity. In such a case, the different PSFs overlap in image space, making fitting challenging. To overcome this challenge, various embodiments include adding a linear phase ramp to one of the phase masks. The linear phase ramp results in a lateral shift of the PSF of one of the wavelengths.

In accordance with some embodiments, object locations of tetrapod PSF data is performed using a maximum likelihood estimation with a numerical scalar imaging model, taking into account refraction index mismatch and using Matlab code.

Figure 10B:
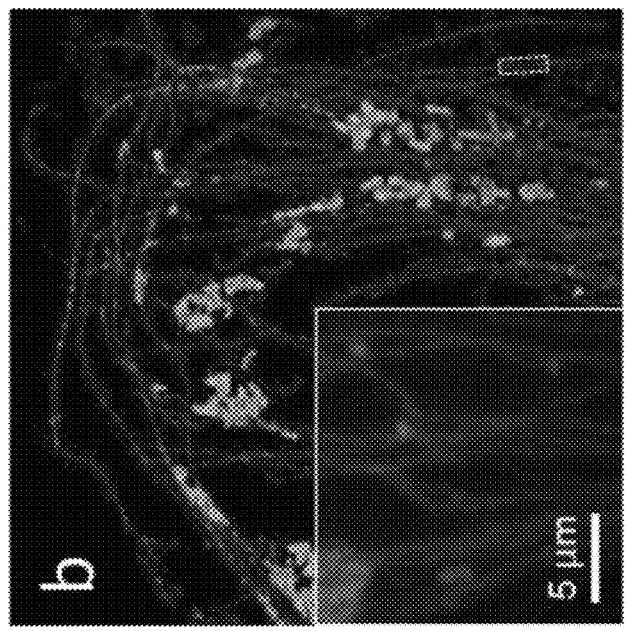
FIGS. 10A-10C illustrate an example of multi-wavelength super resolution imaging using a multi-wavelength point spread function, in accordance with various embodiments.
Figure 10C:
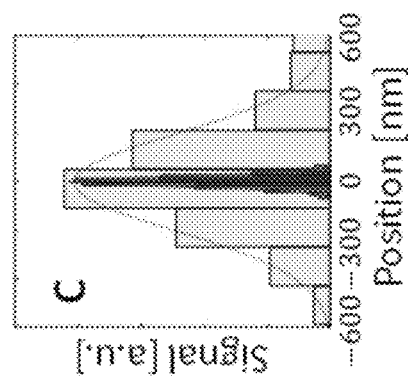
Figure 10A:
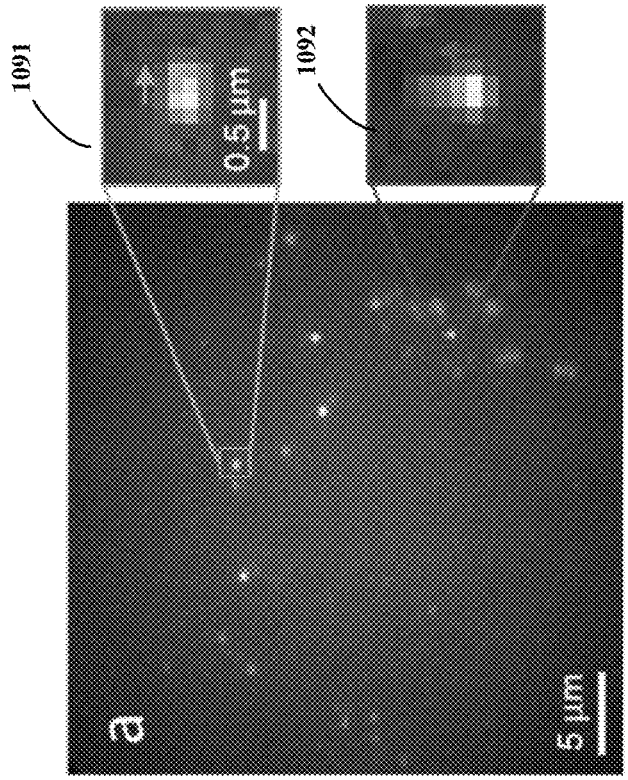

FIGS. 10A-10C illustrate an example of multi-wavelength super resolution imaging using a multi-wavelength phase mask, in accordance with various embodiments. In various embodiments, a multi-wavelength phase mask is used for simultaneous multi-wavelength super-resolution imaging, such as of biological specimen. For example, a fixed BS-C-1 cell is imaged, with microtubules marked by anti-alpha-tubulin primary antibodies labeled with a red fluorescent die, such as Alexa646, and mitochondria marked via anti-ATPB primary and a green fluorescent die, such as Alexa532-labeled secondary antibodies.

Multi-wavelength imaging is performed by acquiring a plurality of images of blinking single molecules. For example, a sequence of images is acquired. In contrast to conventional microscopes, various embodiments include exciting both color labels simultaneously, and recorded on the same region of the apparatus (camera). Further, the wavelength (e.g., color) characteristic of each object is encoded in the resulting PSF shape.

A parameter that determines the precision to which one can localize an object is the number of detected photons. The-phase only liquid crystal SLM, for example, is designed to modulate one polarization of light. The light polarization in the unmodulated direction is filtered out, in various embodiments, by a polarizer upstream from the SLM. To take advantage of the maximal number of signal photons, in a number of embodiments, both polarizations of light are used that are impinging on the SLM. The light polarization that is not modulated by the liquid crystal SLM produces a standard PSF in the image plane. To encode wavelength characteristics, the other polarization is modulated by the multi-wavelength mask by laterally shifting the standard PSF in the y-direction for a first wavelength using a phase ramp, such as corresponding to red, and in the x-direction for a second wavelength using a phase ramp, such as corresponding to green. The combined result of both polarizations in the image plane is a PSF that is elongated vertically for the first wavelength and horizontally for the second wavelength (e.g., see FIG. 10A).

Example super-resolution imaging is illustrated by FIGS. 10A-10C. For example, FIG. 10A illustrates raw data recorded from a super-resolution imaging movie. Two example PSFs of a first wavelength 1092 (e.g., vertically elongated) and a second wavelength 1091 (e.g., horizontally elongated) are enlarged in the inset with the arrows showing the elongation direction. In various embodiments, approximately 430,000 emitters are localized in a 61,000 frame movie. Each identified object is localized using the identified PSFs and a 2D Gaussian fit, and color discrimination is performed according to the direction of elongation (for example, horizontal is green and vertical is red). The attainable resolution is demonstrated by the microtubule FWHM of 53 nm obtained from a histograms of locations in the microtubule section. FIG. 10B illustrates a super-resolution image obtained by localizing each object in the moving and assigning its wavelength (red is microtubules and green is mitochondria). The inset illustrates the diffraction limited data. FIG. 10C illustrates a histogram of localizations within the dotted white box surround a microtubule section of around 2 um in FIG. 10B, and the diffraction limited intensity cross-section from the same region. Considering a known microtubule diameter of around 25 nm, this corresponds to a localization precision (e.g., a standard deviation) of around 21 nm, which is corroborated by repeatedly localizing single molecules that are on for multiple frames in the movie and calculating the standard deviation in localization.

In a number of specific embodiments, for cell imaging, cultured BS-C-1 (*Ceropithecus aethiops* epithelia kidney, ATCC CCL-26) cells are planted onto glass coverslips and cultured for 48 hours in high glucose, DMEM media containing 10% (v/v) fetal bovine serum. Cells are fixed in chilled 4 percent (w/v) paraformaldehyde for 20 minutes and incubated with 10 milliMole (mM) $NH_4CL$ for ten minutes. Cells are permeabilized with three times washing steps containing 0.2% (v/v) Triton-X 100 in pH 7.4 PBS with a five minute incubation between each wash and placed in blocking solution (3 percent w/v BSA in PBS) for one hour before labeling for two hours with Alexa-647-labeled monoclonal rabbit anti-alpha-tubulin primary antibodies (ab190573) and mouse mitochondrial-marking anti-ATPB primary antibodies (an14730) using 1:200 dilution in 3% w/v BSA. Cells are washed three times with 0.2% Triton-X 100 with three minutes waiting between each wash. Goat anti-mouse Alexa 532-conjugated secondary antibody (A11002) labeling is then performed with 1:500 dilution for one hour followed by five washing steps of 0.2% Triton-X 100. Samples are shielded from light and kept at four degrees Celsius until imaged.

Super-resolution imaging is performed 2-3 days after fixing cells. Samples are placed in a cover glass holder, warmed to room temperature, and placed in a blinking media (700 ug Glucose Oxidase, 50 ug/mL catalase, 0.55M Glucose, 140 mM 2-Mercaptoethanol, all Sigma in 0.1M pH Tris.HCl buffer). The sample is scanned at low-intensity laser illumination for suitable regions and imaged with 10 $kW/cm^2$ intensity 641 nm light and 5 $kW/cm^2$ intensity 514 nm light, with a rising intensity of the 405 nm activation laser (0-500 $W/cm^2$).

Figure 11:
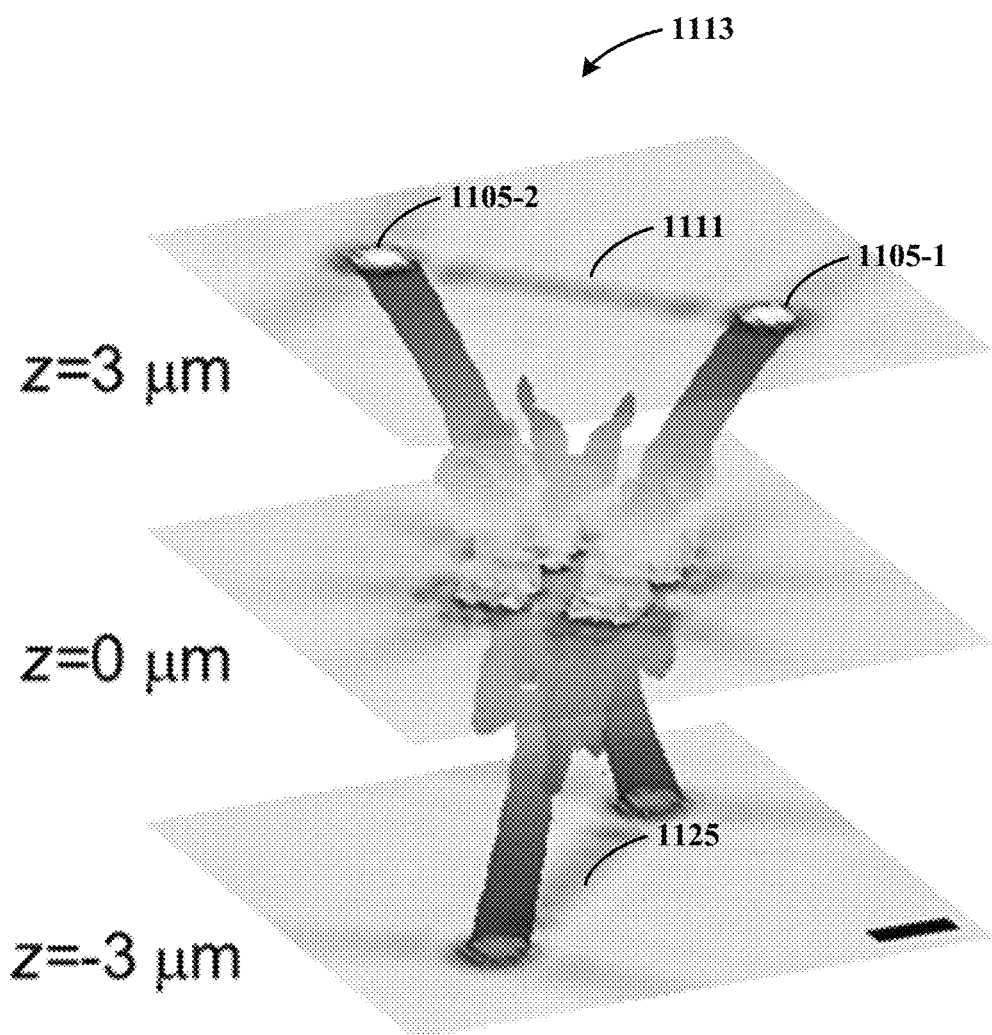
FIG. 11 illustrates an example 3D rendering of tetrapod PSF, in accordance with various embodiments.

FIG. 11 illustrates an example 3D rendering of tetrapod PSF, in accordance with various embodiments. For instance, the 3D rendering of the tetrapod PSF 1113 includes a 6 μm tetrapod PSF image plane intensity as a function of the emitter's axial position away from the focal plane (at z=0). The intensities making up the 3D shape are threshold for visibility. Three slices of the PSF are shown with no thresholding (at z=−3,0,3 μm), displaying the full dynamic range of intensity. Scale bar is 1 μm. As illustrated, in some embodiments, the PSF is created by 2 lobes 1105-1, 1105-2 moved along a first line 1111 above the focal plane, turned 90 degrees, and moved along a second line 1125 below the focal plane. The second line 1125 is perpendicular to the first line 1111. Accordingly, in some embodiments, the modified tetrahedral shape is a characterization of light having two lobes with a lateral distance that changes along a line, having a first orientation, as a function of an axial proximity of the object to the focal plane, and the line having a different orientation depending on whether the object is above or below a focal plane (e.g., two lines from the center to two lobes 1105-1, 1105-2 orientated along a first line 1111 when the object is above the focal plane and two lines from the center to the two lobes oriented along a second line 1125 when the object is below the focal plane, the second line 1125 being perpendicular to the first line 1111).

FIGS. 12A-12B illustrate examples of a light sheet microscope, in accordance with various embodiments. In various embodiments, the apparatus includes a light sheet microscope (LSM) as illustrated by FIG. 12A. The LSM, at any given time, illuminates a slice of a sample and/or an object, around 2 um thick, by a sheet of light. LSM, in various embodiments, utilizes a tilted illumination 1295 relative to the focal plane. For example, optics 1293 and a scanning mirror 1294 are configured and arranged to provide the illumination 1295, a slice of the sample 1296 and/or the object at a time. Thereby, the optics pass a sheet of light through the sample 1296 and/or the object and the light from the object propagates toward the imaging plane. The scanning mirror 1294, in various embodiments, is utilized to adjust the height of the light sheet in the sample. Light emitted 1299 from the slice of the sample is detected using circuitry 1298, such as imaging circuitry. FIG. 12B illustrates an example of illuminating 1295 a slice 1297 of a sample 1296 at a time using an LSM, such that only portions of the sample 1296 are illuminated at a given time.

In various embodiments of the present disclosure, an LSM (e.g., a relatively simple LSM) is used because the depth information is already encoded in the PSF shapes and the sample 1297 is illuminated in a descending angle relative to the field of view. For example, the z-slice illuminated by the LSM is not parallel to the focal plane of the objective, but rather, it is tilted by some angle. Due to the large depth range, PSFs in accordance with certain embodiments of the present disclosure provide an angle that is steep (tens of degrees). Therefore, imaging is performed all the way down to the substrate, and the light sheet is scanned in the axial direction to cover the entire sample.

Various embodiments include an imaging modality based on optimized tetrapod PSFs, capable of high-precision imaging throughout a tunable axial range. For example, large-axial-range tracking in a microfluidic device is performed, tracking under biological conditions of a Quantum dot-labeled molecule diffusing on the membrane surface of live mammalian cells, as well as single-fluorophore localization capabilities over a 7 μm axial range. Thereby, the tetrapod PSF is used to perform high-precision, scan-free tracking of multiple emitters over an exceptionally large z-range.

As previously discussed, an imaging model is used by the circuitry. The imaging model is based on scalar diffraction theory of light from a point source (i.e. polarization effects are not included), which yield simulation results that match experimentally obtained data. For a description of more detailed modeling considerations, reference may be made to FIG. 2 which for various example embodiments, can involve an image model (e.g., an image formulation model) built for 3D imaging using a function, such as:

$$I(u, v; x, y, z) \propto |\mathcal{F}\{E(x', y'; x, y, z)P(x', y')\}|^2,$$

where I(u, v) is the image, or the intensity in the image plane 232 (e.g., camera plane), of a point source located at position (x, y, z) in sample space, relative to the focal plane and the optical axis (z). The field in the pupil plane, caused by the objective lens 216 (e.g., point source), is denoted by E(x', y'), and $\mathcal{F}$ represents the 2D spatial Fourier transform with appropriate coordinate scaling. The complex function P(x', y') is the pattern imposed in the pupil plane by a phase mask 228 (e.g., mask or an SLM).

The optical model consists of a two-layer experimental system consisting of water (refractive index $\eta_1$=1.33), and glass/immersion oil (which have matched refractive index of $\eta_2$=1.518). Light from a single emitter in the sample acquires a phase factor (i.e. defocus) determined by the distance between the emitter and the interface separating layer 1 and layer 2 ($z_1$) and the distance between the microscope focal plane and the interface $z_2$). An additional phase factor $_P$ is imposed by the phase mask—which, by virtue of the 4f system, is modeled as being located within the pupil of the apparatus objective. For a given emitter, the overall phase $\psi_{pupil}$ of light at a given point {x', y'} within the apparatus pupil is given by the equation:

$$\psi_{total}(x', y') = P(x', y')e^{ikn_1z_1\sqrt{1-x'^2-y'^2} + ikn_2z_2\sqrt{1-\frac{n_1}{n_2}(x'^2+y'^2)}}$$

Note that if the interface is between the focal plane and the emitter, the sign of $z_2$ is positive. If the interface is closer to the objective lens than the focal plane, $z_2$ is negative. In this expression, a coordinate system is used that is normalized such that points along the circle $\sqrt{x'^2+y'^2}$N.A./$n_2$ lie on the outer edge of the tetrapod phase mask. Due to the objective, the electric field of light along the outer edge of the microscope pupil has a greater amplitude than light close to the center of the pupil. This amplitude factor $A_{pupil}$ is given by:

$$A_{pupil}(x', y') = \begin{cases} \left(\frac{1}{1-x'^2-y'^2}\right)^{\frac{1}{4}} & \text{if } \sqrt{x'^2+y'^2} \leq n_1/n_2 \\ 0 & \text{otherwise} \end{cases}$$

Using the imaging model, the region of non-zero amplitude is limited to points inside the circle $\sqrt{x'^2+y'^2} \leq n_1/n_2$, due to the fact that super-critical light, inhabiting the region $n_1/n_2 < \sqrt{x'^2+y'^2}$=N.A./$n_2$ is attenuated for objects (e.g., emitters) which are an appreciable distance ($\lambda < z_1$) from the interface. After light has propagated beyond the objective, paraxial approximations are valid. Specifically, the tube lens of the microscope performs an optical Fourier transform operation. The electric field present at a point (u, v) in the microscope's image plane, ($E_{img}$) is given by the formula:

$$E_{img}(u,v) = FT\{A_{pupil}(x',y')\psi_{pupil}(x',y')\} = FT\{E(x',y';x,y,z)P(x',y')\},$$

where E(x',y') is the Fourier-plane electric field mentioned herein in connection with the image formulation model (equation). The intensity within the image plane is then:

$$I_{img}(u,v) = E_{img}(u,v)E^*_{img}(u,v).$$

Finally, object-space coordinates (x, y) are related to image-space coordinates (u, v) by a scaling factor M, the overall magnification of the microscope.

The precision of a given PSF can be quantified by the Cramer Rao Lower Bound (CRLB) which is a mathematical quantity indicative of the sensitivity of a measurement to its underlying parameters. The optimization procedure is based on a CRLB minimization method. With the CRLB being related to (e.g., as the inverse of) the Fisher information matrix the objective function being minimized is the mean trace of the Fisher information matrix (corresponding to mean x,y,z CRLB) over a finite set of N unique z positions in a defined z-range. More specifically, the CRLB corresponds to the lowest possible variance in estimating these parameters with an unbiased estimator. In accordance with various specific embodiments of the present disclosure, the measurement is a noisy, pixelated manifestation of the PSF (the 2D image), and the underlying parameters are the 3D coordinates of the object (e.g., emitter), as well as the brightness expressed as total photons, and a background level. In various embodiments, given the apparatus parameters (such as magnification, numerical aperture, background and signal levels, and a (Poisson) noise model), a numerical imaging model is built based on the above image-model equation and is used to find the Fourier phase pattern P(x',y') which yields the PSF with the lowest theoretical localization variance (or the lowest CRLB).

The objective function being minimized is the mean CRLB in x, y and z, over a predetermined z-range composed of N distinct z (depth) values. In various embodiments, the optimization is performed over the set of the first 55 Zernike polynomials, so that the sought solution is a coefficient vector $c \in R^N$ with N=55. The mathematical optimization problem, solved using Matlab's fmincon function, using the 'interior point' method, is therefore:

$$\min_c \sum_{j=\hat{x},\hat{y},\hat{z}} \sum_{z \in Z} \sqrt{\frac{1}{I_{jj}(c, z)}},$$

where, assuming additive Poisson noise and a constant background of $\beta$, the Fisher information matrix for a point source along the optical axis is given according to the following equation by:

$$I(c; 0, 0, z) = \sum_{k=1}^{N_p} \frac{1}{\mu_{c,z}(k) + \beta} \left(\frac{\partial \mu_{c,z}(k)}{\partial \theta}\right)^T \left(\frac{\partial \mu_{c,z}(k)}{\partial \theta}\right).$$

Here, $\theta=(x, y, z)$ is the 3D position of the emitter, summation is performed over the sum of image pixels $N_p$, and $\mu_{c,z}$ is a model of the detected PSF for an emitter at z, including the total number of signal photons per frame, magnification and pixelation, for a PSF produced by a Fourier-plane mask P(x', y') defined by:

$$P(x', y') = \text{circ}(r/R) \cdot \exp(iD_{zer} \cdot c)$$

where $r = \sqrt{x'^2 + y'^2}$, R is the radius of the pupil plane, $$\text{circ}(\eta) = \begin{cases} 1, & \eta < 1 \\ 0, & \eta \geq 1 \end{cases},$$

and $D_{zer}$ is the linear operator transforming the vector of Zernike coefficients to the 2D phase pattern to be projected on the SLM. The SLM is discretized to a 256×256 grid, so that $D_{zer} \in R^{256^2 \times 55}$, where each column is a vector-stacked 2D image of the corresponding Zernike polynomial.

A set of tetrapod PSFs with z-ranges throughout the 2-20 μm range can be derived by running the optimization procedure iteratively. Starting with a design z-range of 2 μm, the procedure is run once to produce an optimal PSF. Then, the output solution is used as an initial point for another iteration, with a larger z-range of 4 μm. This iterative process is repeated, iteratively increasing the z-range by 2 μm each time, to a final z-range of 20 μm.

Performing optimization with different specified z-ranges, in some embodiments, yields different phase masks (and corresponding PSFs) that share common characteristics including for any tested z-range (e.g., from 2-20 μm), two distinct lobes, with growing transverse distance between them as the emitter departs from the apparatus' focal plane. The orientation of the two lobes of the PSF, in some embodiments, is rotated by 90° above and below the focal plane. PSFs, in accordance with the present disclosure, are therefore referred to as tetrapod PSFs, due to the 3D tetrahedral shape they trace out as the object is moved in z (the axial direction).

In accordance with various embodiments, using the above described imaging apparatus with PSF engineering (e.g. the 4f optical system with phase mask in the Fourier plane), a phase pattern is designed that produces different PSFs for different wavelengths. Such embodiments allow for simultaneous scan-free 3D imaging of objects with different wavelengths using a signal optical channel (e.g., a single channel). The resulting phase mask is used to encode spectral information in the PSF of the apparatus. PSF engineering for 3D imaging exploits optical aberrations for encoding depth and uses chromatic aberrations for encoding color.

In terms of signal compromise, in various embodiments, the elongated PSF used in cell measurement (e.g. FIG. 10A-10C) is around 13% dimmer than a standard PSF. In terms of spectral separation, a liquid crystal SLM in some embodiments generates a multi-wavelength tetrapod PSF at up to a 20 um z-range for two objects at wavelengths that are separated by 60 nm or more. One limitation of the multi-wavelength liquid crystal SLM is the modulated range is limited to around $4\pi$ at 633 nm, and has a spectral dependence as the SLM relies on finding the voltage values that optimizes the different phase delays for the different wavelengths. Further, the liquid crustal SLM modulates one polarization, which limits the detectable signal and degrades object detectability, localization precision, and spatial resolution. The limitation of only one polarization, in various embodiments, is overcome by utilizing the unmodulated part of the emitted light as described above.

In some embodiments, the phase mask is a dielectric mask. A dielectric mask includes a multi-wavelength phase mask that can create a PSF for five or more different wavelengths, in a 300 nm spectral range.

Various specific embodiments involve a system that includes a 4f optical processing system with a side-port of an Olympus IX71 microscope frame, with a 100 times/1.4 NA oil-immersion objective lens. The 4f system includes two 150 nm achromat lenses, a polarizing beamsplitter to reject light polarized perpendicular to the axis along which the phase mask (SLM) is capable of modulating phase, a 512 by 512 pixel SLM, and assorted mirrors for beam-steering. A camera is used to record data. In various embodiments, simultaneous illumination of the sample is performed using a 641 nm diode laser, and a 514 nm line of an Ar-iron laser. Excitation light is reflected off of a multi-bandpass dichroic, and fluorescence is transmitted through the same dichroic, and pass through an additional multi-bandpass emission filter, a notch filter, and a 514 long pass filter.

Various blocks, modules or other circuits may be implemented to carry out one or more of the operations and activities described herein and/or shown in the figures. In these contexts, a "block" (also sometimes "circuitry", "circuit", or "module") is a circuit that carries out one or more of these or related operations/activities (e.g., optimization, encoding wavelength-based characteristics, encoding 3D positions, detect light, generate 3D image, or manipulate a phase mask). For example, in certain of the above-discussed embodiments, one or more modules are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Also, although aspects and features may in some cases be described in individual figures, it will be appreciated that features from one figure or embodiment can be combined with features of another figure or embodiment even though the combination is not explicitly shown or explicitly described as a combination.

Terms to exemplify orientation, such as upper/lower, left/right, top/bottom, above/below, and axial/lateral (as well as x, y, and z), may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Certain embodiments are directed to a computer program product (e.g., nonvolatile memory device), which includes a machine or computer-readable medium having stored thereon instructions which may be executed by a computer (or other electronic device) to perform these operations/activities.

Various embodiments are implemented in accordance with the underlying Provisional Application (Ser. No. 62/146,024) to which benefit is claimed and which is fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

The underlying Provisional Application (including its Appendices) are hereby fully incorporated by reference for their general and specific teachings. Appendix A entitled "Precise 3D scan-free multiple-particle tracking over large axial ranges with Tetrapod point spread functions", Appendix B entitled "Precise 3D scan-free multiple-particle tracking over large axial ranges with Tetrapod point spread functions", Appendix C entitled "Appendix C", Appendix D entitled "Tetrapod Phase Mask Microscopy for high precision three-dimensional position estimation over a large, customizable depth range", and Appendix E entitled "Multi-color PSF design." Consistent with embodiments of the present disclosure, Appendices A, B, and D describe and show examples of optical apparatuses and use of the optical apparatuses to localize objects in three dimensions. Appendix C shows examples of localization of objects in three dimensions using an optical apparatus in accordance with various embodiments. Appendix E, consistent with embodiments of the present disclosure, describes and shows examples of optical apparatus with multi-color phase masks and use of optical apparatuses to localize multiple objects in three dimensions and in different wavelengths.

What is claimed is:
1. A light-field microscopic apparatus comprising:
optics configured and arranged in an optical path, wherein the optics and the optical path are configured and arranged to pass light for tilted illumination of an object and to modify a shape of light, wherein the illumination is tilted at an acute angle relative to a focal plane of the object and while being illuminated light is emitted from the object, and
circuitry configured and arranged to respond to the light emitted from the object by generating a three-dimensional image from the light and by using the modified shape to provide depth-based characteristics of the object.
2. The apparatus of claim 1, wherein the shape modification characterizes the light as having two lobes with a lateral distance that changes along a line, having a first orientation, as a function of an axial proximity of the object to a focal plane, and with the line having a different orientation depending on a location of the object relative to the focal plane.

3. The apparatus of claim 1, further including a phase mask in or along the optical path, wherein the optics and the phase mask are configured and arranged to modify a shape of light passing along the optical path, as passed from the object.
4. The apparatus of claim 1, wherein the optics includes one, or a combination, of the following: grating, prism, lens, mirror, and wherein the object includes one, or a combination, of the following: emissive particles or molecules, or biologic molecules.
5. A light-field microscopic apparatus comprising:
optics configured and arranged in an optical path, wherein the optics and the optical path are configured and arranged to pass light for tilted illumination of an object and to modify a shape of light, wherein the illumination is tilted at an acute angle relative to a focal plane of the object and while being illuminated light is emitted from the object, and
circuitry configured and arranged to respond to the light emitted from the object by generating a three-dimensional image from the light and by using the modified shape to provide depth-based characteristics of the object, wherein the tilted angle is provided for depth-based imaging of the object into and through the object, and wherein the optics include a mirror which is configured and arranged to adjust an axial height of the light sheet for scanning in an axial direction to sequentially illuminate the object.
6. The apparatus of claim 5, wherein the optics includes one, or a combination, of the following: grating, prism, lens, mirror, and wherein the object includes one, or a combination, of the following: emissive particles or molecules, or biologic molecules.
7. A light-field microscopic apparatus comprising:
optics configured and arranged in an optical path, wherein the optics and the optical path are configured and arranged to pass light for tilted illumination of an object and to modify a shape of light, wherein the illumination is tilted at an acute angle relative to a focal plane of the object and while being illuminated light is emitted from the object, and
circuitry configured and arranged to respond to the light emitted from the object by generating a three-dimensional image from the light and by using the modified shape to provide depth-based characteristics of the object, wherein the depth-based characteristics of the object are encoded in PSF shapes and the object is illuminated at the tilted angle, corresponding to a descending acute angle relative to the field of view.
8. The apparatus of claim 7, wherein the tilted angle is set, in order to facilitate providing a desired depth range, to be at least 20 degrees.
9. The apparatus of claim 7, wherein the tilted angle is set to permit depth-based imaging of the object into and through the object to a substrate against which the object is supported.
10. The apparatus of claim 7, wherein the tilted angle is set to permit depth-based imaging of the object, and wherein the light sheet is shifted in an axial direction to sequentially illuminate slices of the object.
11. The apparatus of claim 7, wherein the optics includes one, or a combination, of the following: grating, prism, lens, mirror, and wherein the object includes one, or a combination, of the following: emissive particles or molecules, or biologic molecules.

12. A method comprising:
providing a light-field microscopic with optics to pass light in or along an optical path for tilted illumination of an object and to modify a shape of light, wherein the illumination is tilted at an acute angle relative to a focal plane of the object and while the object is being illuminated, light is emitted from the object; and
generating a three-dimensional image from the light, using the modified shape to provide depth-based characteristics of the object, and in response, causing circuitry to respond to the light emitted from the object.

13. The method of claim 12, wherein the optics includes one, or a combination, of the following: grating, prism, lens, mirror, and wherein the object includes one, or a combination, of the following: emissive particles or molecules, or biologic molecules.

14. The method of claim 12, wherein the tilted angle is provided for depth-based imaging of the object into and through the object, further including using the optics to adjust an axial height of the light sheet and scanning in an axial direction to sequentially illuminate the object.

15. The method of claim 12, wherein the shape modification characterizes the light as having two lobes with a lateral distance that changes along a line, having a first orientation, as a function of an axial proximity of the object to a focal plane, and with the line having a different orientation depending on a location of the object relative to the focal plane.

16. The method of claim 12, further including providing a phase mask in or along the optical path, and using the optics and the phase mask to modify a shape of light passing along the optical path, as passed from the object.

17. The method of claim 12, wherein the depth-based characteristics of the object are encoded in PSF shapes, and further including illuminating the object at the tilted angle, corresponding to a descending acute angle relative to the field of view.

18. The method of claim 12, further including using or setting the tilted angle to facilitate providing a desired depth range, to be at least 20 degrees.

19. The method of claim 12, further including using or setting the tilted angle to permit depth-based imaging of the object into and through the object to a substrate against which the object is supported.

20. The method of claim 12, further including using or setting the tilted angle to permit depth-based imaging of the object, wherein the object includes a biological sample, and wherein the light sheet is shifted in a direction to sequentially illuminate slices of the sample.

* * * * *